United States Patent
Allen et al.

(10) Patent No.: US 8,954,627 B2
(45) Date of Patent: Feb. 10, 2015

(54) FIBRE CHANNEL N-PORT ID VIRTUALIZATION PROTOCOL

(71) Applicant: International Business Machines Corporation, Armonk, NY (US)

(72) Inventors: James P. Allen, Austin, TX (US); Michael P. Cyr, Georgetown, TX (US); Robert G. Kovacs, Austin, TX (US); James A. Pafumi, Leander, TX (US); James B. Partridge, Bastrop, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/724,394

(22) Filed: Dec. 21, 2012

(65) Prior Publication Data

US 2013/0117481 A1    May 9, 2013

Related U.S. Application Data

(63) Continuation of application No. 12/136,042, filed on Jun. 9, 2008, now Pat. No. 8,341,308.

(51) Int. Cl.
*G06F 3/00*    (2006.01)
*G06F 13/42*    (2006.01)
*H04L 12/801*    (2013.01)
(Continued)

(52) U.S. Cl.
CPC ............... *G06F 13/42* (2013.01); *H04L 47/10* (2013.01); *H04L 47/36* (2013.01); *H04L 67/1097* (2013.01)
USPC .......................................................... 710/15

(58) Field of Classification Search
USPC .......................................................... 710/15
See application file for complete search history.

(56) References Cited

U.S. PATENT DOCUMENTS 6,128,668 A * 10/2000 Barber et al. ................. 709/246
6,965,559 B2    11/2005 Grabauskas et al.
(Continued)

FOREIGN PATENT DOCUMENTS

JP    2007179529    7/2007
WO    2007076382    7/2007

OTHER PUBLICATIONS

Zoltsn Meggyesi, Fibre Channel Overview, date: Aug. 1994; pp. 13; CERN; World Wide Web.
(Continued)

*Primary Examiner* — Chun-Kuan Lee
(74) *Attorney, Agent, or Firm* — Damion Josephs; Robert C. Rolnik

(57) ABSTRACT

Disclosed is a computer implemented method, data processing system and computer program product to discover an SCSI target. The method comprises a client adapter transmitting an N_port ID virtualization (NPIV) login to a virtual I/O server (VIOS). The client adapter receives a successful login acknowledgement from the VIOS and issues a discover-targets command to the fabric. Upon determining that the SCSI target information is received, wherein the SCSI target information includes at least one SCSI identifier. Responsive a determination that SCSI target information is received the client adapter issues a port login to a target port, wherein the target port is associated with the at least one SCSI target. The client adapter makes a process login to form an initiator/target nexus between a client and at least one SCSI target. The client adapter queries the SCSI target by using a world wide port name associated with the target port.

16 Claims, 8 Drawing Sheets

(51) Int. Cl.
*H04L 12/805* (2013.01)
*H04L 29/08* (2006.01)

(56) References Cited

U.S. PATENT DOCUMENTS

| | | | |
|---|---|---|---|
| 7,602,774 | B1 | 10/2009 | Sundaresan et al. |
| 7,836,332 | B2 * | 11/2010 | Hara et al. ............... 714/5.11 |
| 2003/0093567 | A1 * | 5/2003 | Lolayekar et al. ............ 709/246 |
| 2006/0130052 | A1 | 6/2006 | Allen et al. |
| 2006/0187908 | A1 | 8/2006 | Shimozono et al. |
| 2007/0005820 | A1 | 1/2007 | Banzhaf et al. |
| 2007/0147267 | A1 | 6/2007 | Holland |
| 2007/0174851 | A1 * | 7/2007 | Smart ........................ 719/324 |

OTHER PUBLICATIONS

Chun Kuan Lee, Office Action, dated Jan. 6, 2011.
Robert C. Rolnik_Amendment to Office Action1, dated Mar. 9, 2011.
Chun Kuan Lee, FinalOffice Action, dated Apr. 4, 2011.
Robert C. Rolnik, RequestforContinuedExam, dated Jun. 29, 2011.
Chun Kuan Lee, Office Action, dated Jul. 29, 2011.
Robert C. Rolnik, Amendment to Office Action, dated Oct. 31, 2011.
Chun Kuan Lee, FinalOffice Action, dated Jan. 10, 2012.
Robert C. Rolnik, Notice of Appeal_PTOSB31, dated Apr. 9, 2012.

* cited by examiner

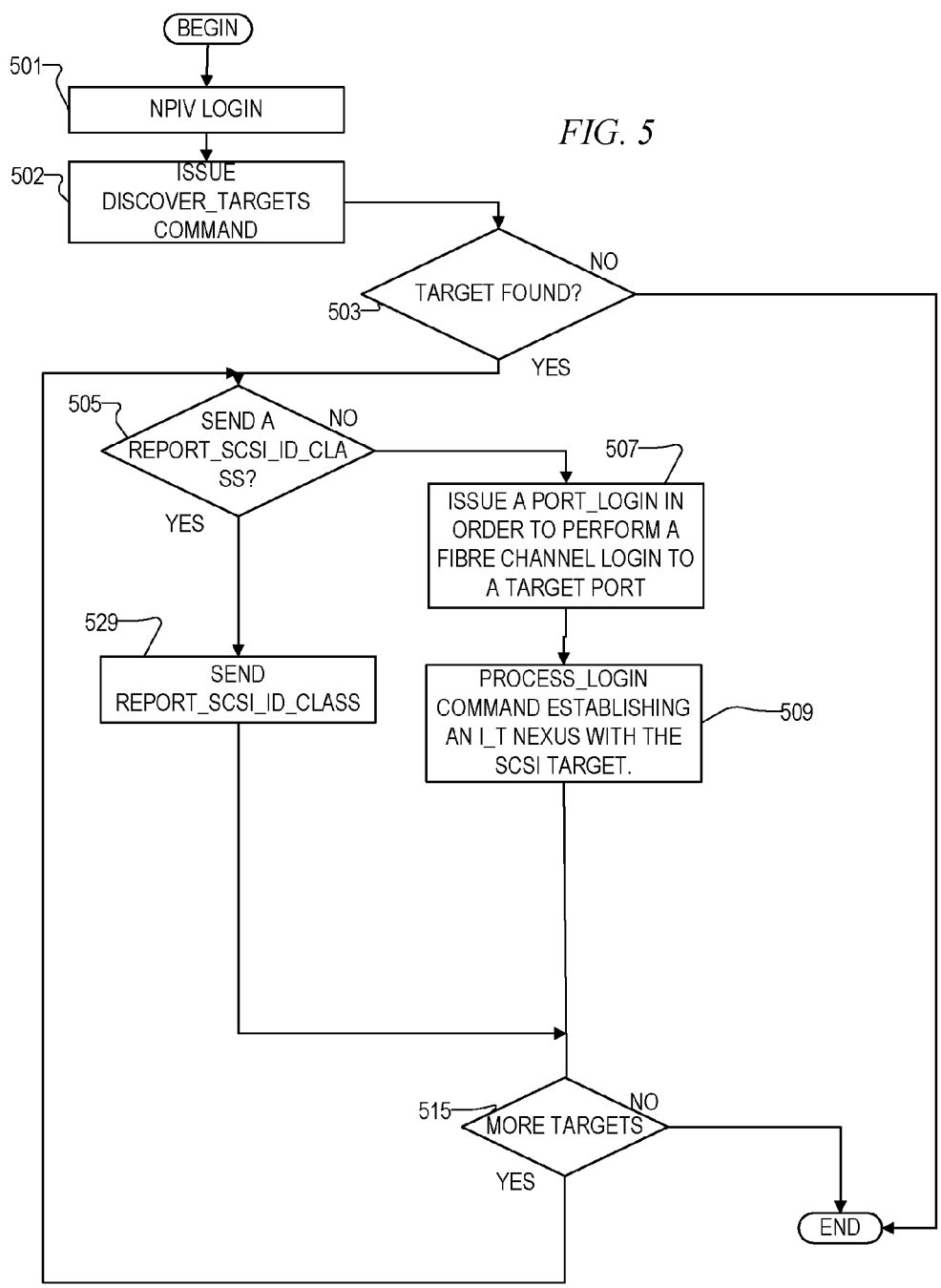

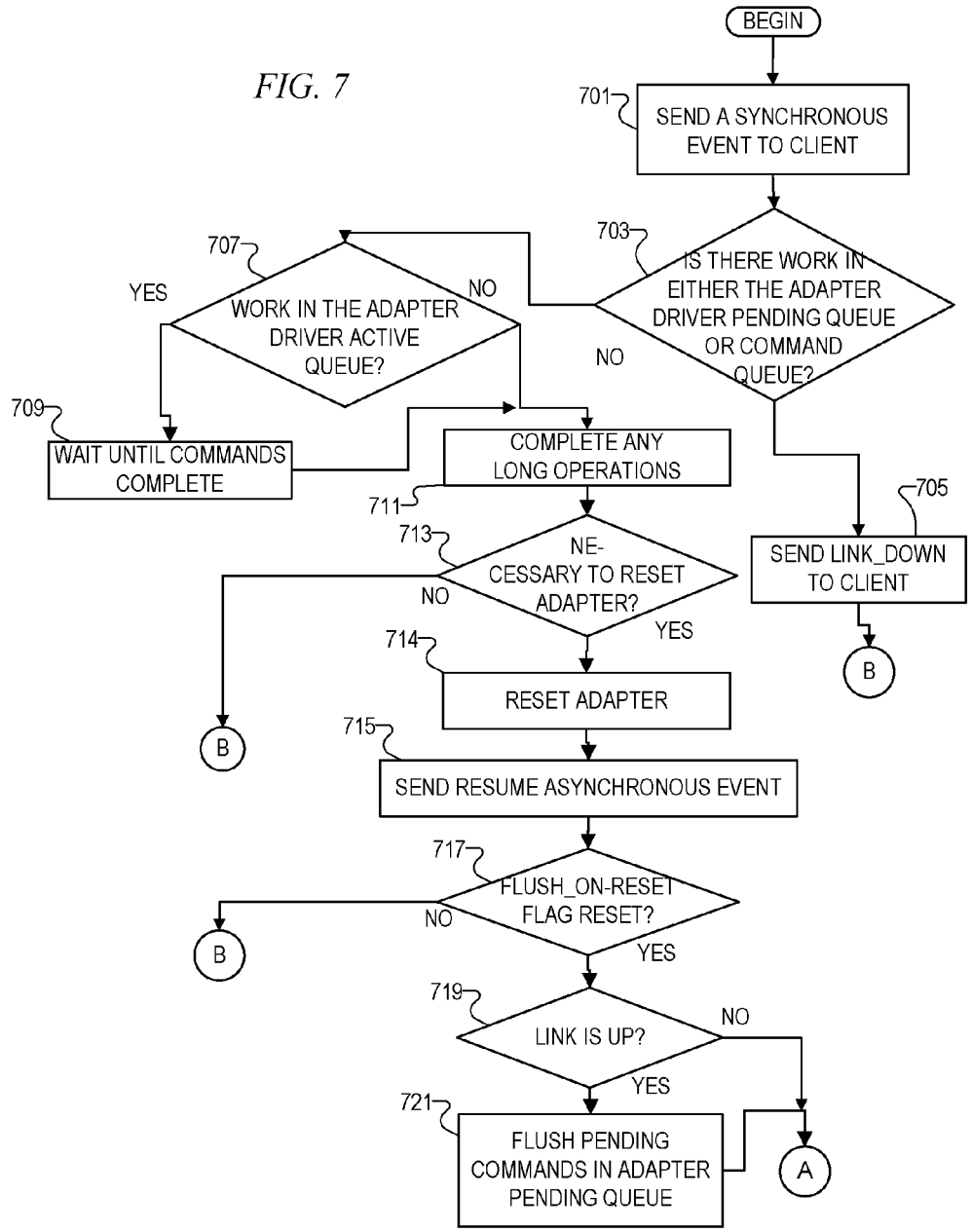

FIBRE CHANNEL N-PORT ID VIRTUALIZATION PROTOCOL

BACKGROUND OF THE INVENTION

The present invention provides a computer implemented method and apparatus to discover an SCSI target. The method comprises a client adapter transmitting an N_port ID virtualization (NPIV) login to a virtual I/O server (VIOS). The client adapter receives a successful login acknowledgement from the VIOS and issues a discover-targets command to the fabric. Next, the client adapter determines that the SCSI target information is received, wherein the SCSI target information includes at least one SCSI identifier. Responsive to a determination that SCSI target information is received the client adapter issues a port login to a target port, wherein the target port is associated with the at least one SCSI target. The client adapter makes a process login to form an initiator/target nexus between a client and at least one SCSI target. The client adapter queries the SCSI target by using a world wide port name associated with the target port.

Improvements in processor speeds have outpaced improvements in data networking. In response, the networking industry has adopted, and continues to develop, a more robust networking protocol called Fibre Channel. Fibre Channel is a set of standards promulgated by the American National Standards Institute (ANSI).

Fibre Channel is a blend of two models of data communication architecture, the switched point-to-point connection model, and the network model. Accordingly, Fibre Channel devices support, on one hand, channel protocols such as, for example, Small Computer System Interface (SCSI) and High Performance Parallel Interface (HIPPI). In addition, Fibre Channel devices support, on the other hand, networking protocols and topologies such as, for example, Ethernet, Token Ring, and Fiber Distributed Data Interface (FDDI).

A feature of a network having fibre channel functionality is the fabric or switch. The fabric connects two devices with connections called links. Each device has at least an N_port or node port. A device attaches to the fabric by matching the associated N_port to a corresponding F_port on the fabric. The F_port is a fabric port, and is located on the switch. Accordingly, a link may be terminated to an N_port and to a matching F_port.

A common device attached at the N_port side of a link is a Host Bus Adapter (HBA). A Host Bus Adapter is a device that connects a host or computer to other network or storage devices. The HBA may connect, for example, to SCSI, Fibre Channel and eSATA devices, among others.

N_Port ID Virtualization (NPIV) is a fibre channel industry standard technology that provides the capability to assign a physical fibre channel HBA port to multiple unique world wide port names (WWPNs). The world wide port names can then be assigned to multiple initiators such as Operating Systems. Thus, NPIV allows physical Port to be logically partitioned into multiple logical ports and/or Fibre Channel (FC) addresses so that a physical HBA can support multiple initiators, each with a unique N_Port ID.

From the Storage Area Network (SAN) perspective, a NPIV HBA with multiple WWPN's configured would appear to be multiple WWPNs. Such WWPNs may be from an indeterminate number of host nodes and an indeterminate number of HBAs. From the host side, the NPIV HBA may also support multiple WWPNs corresponding, as a group, to a single host node and HBA.

NPIV supports the Virtual I/O Server (VIOS) provisioning of dedicated logical ports to client LPAR's rather than individual LUNs. Each client partition with an NPIV logical port may operate as though the client partition has its own dedicated FCP adapter(s).

The Virtual I/O Server may be a software component located in a logical partition. This component facilitates the sharing of physical I/O resources between client logical partitions within the physical server. Logical partitions can be, for example, AIX® and Linux®. The Virtual I/O Server provides virtual SCSI target and Shared Ethernet Adapter capability to client logical partitions within the system, allowing the client logical partitions to share SCSI devices and adapters, among other features.

BRIEF SUMMARY

The present invention provides a computer implemented method and apparatus to discover an SCSI target. The method comprises a client adapter transmitting an N_port ID virtualization (NPIV) login to a virtual I/O server (VIOS). The client adapter receives a successful login acknowledgement from the VIOS and issues a discover-targets command to the fabric. Upon determining that the SCSI target information is received, wherein the SCSI target information includes at least one SCSI identifier. Responsive a determination that SCSI target information is received the client adapter issues a port login to a target port, wherein the target port is associated with the at least one SCSI target. The client adapter makes a process login to form an initiator/target nexus between a client and at least one SCSI target. The client adapter queries the SCSI target by using a world wide port name associated with the target port.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a Virtual I/O (VIO) client using commands on a fibre channel in accordance with an illustrative embodiment of the invention;

DETAILED DESCRIPTION

Figure 1:
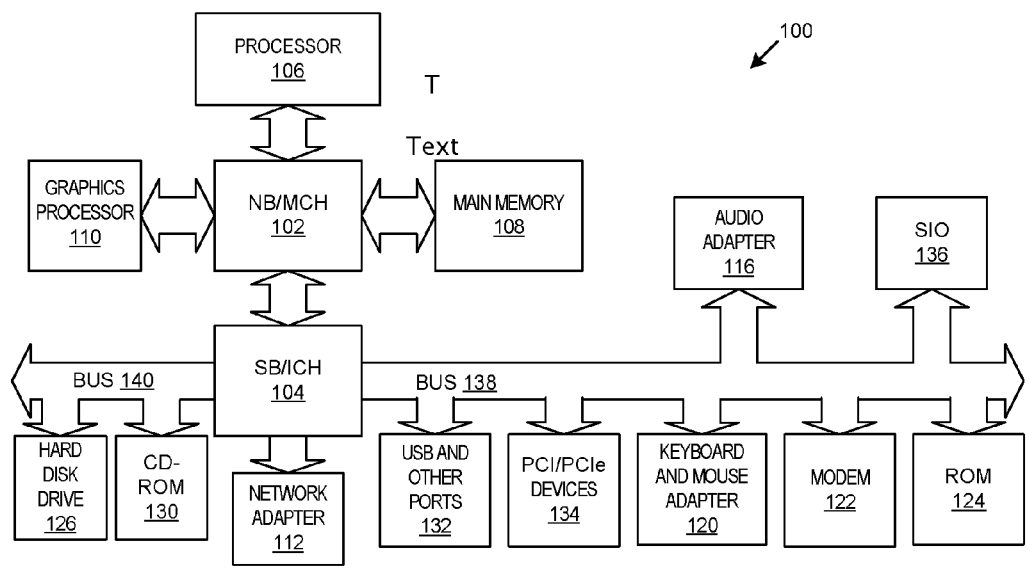
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable storage device(s) may be utilized. The computer-usable or computer-readable storage device may be, for example but not limited to, an electronic, magnetic, optical, or semiconductor system, apparatus, device. The term "computer readable storage device" does not encompass a signal propagation media. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable storage device could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage device may be any storage device that can store, the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage device that can direct a computer or other programmable data processing apparatus to function in a particular manner, such that the instructions stored in the computer-readable storage device produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for interfacing to a Fibre Channel adapter protocol driver in a client operating system and providing N_Port ID Virtualization (NPIV) features. Accordingly, illustrative embodiments of the invention provide a protocol between Virtual I/O Server (VIOS) and client operating systems for communication, error detection, and error correction features. One or more embodiments may support existing Fibre Channel Protocol (FCP) drivers without modification to the driver. In addition, one or more embodiments may use a Storage Area Network (SAN) bridge to transport the protocol.

Figure 3:
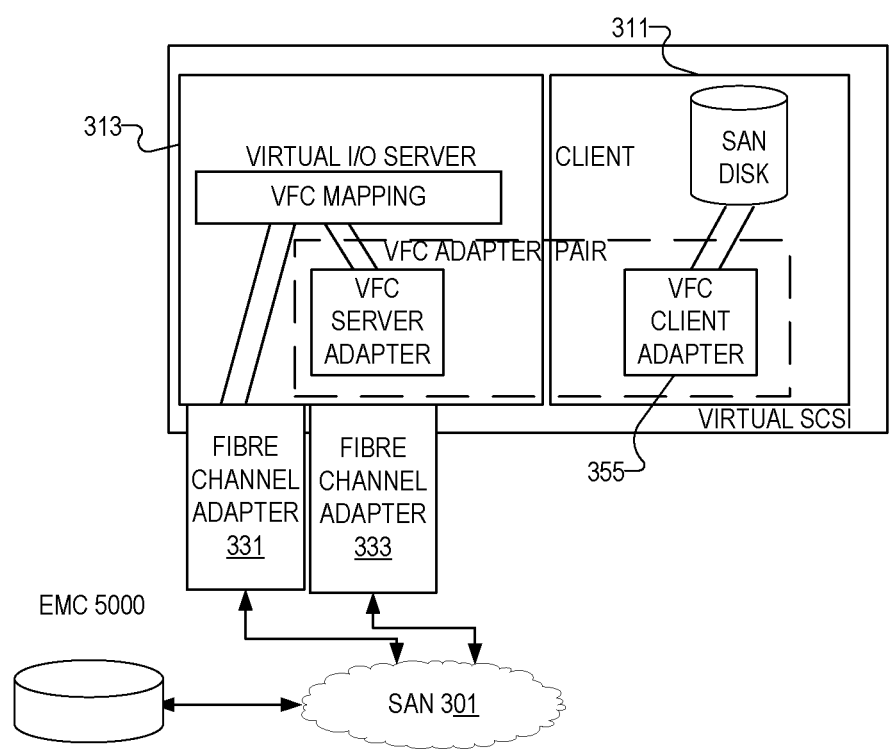
FIG. 3 is a SAN bridge implementation in accordance with an illustrative embodiment of the invention.

FIG. 3 shows a SAN bridge implementation in accordance with an illustrative embodiment of the invention. The SAN bridge implementation refers to a model where VIOS 313 provides bridge and/or hub functionality. The VIOS is primarily a conduit from the client to the SAN through the NPIV logical port. The VIOS may be, for example, a software component operated by the processor 100 of FIG. 1. The NPIV logical port is assigned to the client partition and all devices accessible through the logical port are directly discovered and instantiated in the client only. FIG. 3 depicts the client as virtual I/O (VIO) client 311. More specific examples of the VIO client can include the EMC 5000 storage controller by IBM, and the IBM 2105 Enterprise Storage Server, among others. The VIOS does not need to access the devices on the logical port. The VIO client has an unfiltered channel into SAN 301. In FIG. 3, SAN 301 performs as a fabric, described above. The VIOS's role is to facilitate HBA sharing and the only abstraction is at the HBA level.

Illustrative embodiments of the invention may support legacy fibre channel adapters on the client. Accordingly, a client can use current fibre channel protocol in available drivers. An additional layer of code may support NPIV. However, using the fibre channel protocol enables the use of features such as strip merge, and link commands.

Adapter driver vendors present different interfaces to manage the fabric as performed by SAN 301. Such interfaces, alert drivers, for example, Virtual Fibre Channel (VFC) client adapter 355, asynchronously to fabric changes and present frames to fibre channel targets. A frame is a unit of communication formed for transmission across a link. A frame may also be referred to as a Virtual Fibre Channel (VFC) frame. A frame may include information to be transmitted, a source port identifier, a destination port, and link control information. The illustrative embodiments of the invention have a flexible generalized frame, an asynchronous notification strategy and several management datagrams. Illustrative embodiments also allow a pass thru feature that can be used to support the common HBA interface.

A user has the option to allocate single-port virtual fibre channel adapters. The client adapters each support a single NPIV port for use as NPIV Device Pass Thru. The client adapter is allocated as part of an adapter pair. The adapter pair is supported by a NPIV server bridge, which is represented as an adapter in the VIOS. The corresponding physical adapters for the adapters represented in the VIOS are, for example, fibre channel adapter 331 and fibre channel adapter 333. Accordingly, the fibre channel adapters may be examples of a physical fibre channel adapter 260 of FIG. 2B, below.

Figure 2A:
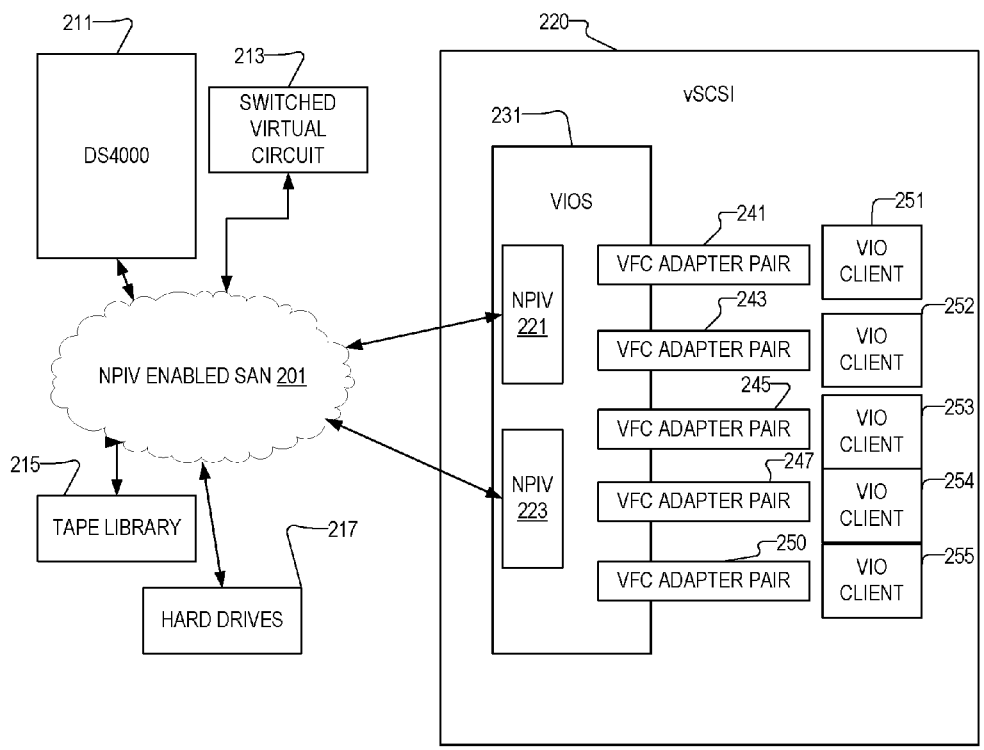
FIGS. 2A and 2B is a VIOS with two NPIV capable adapters and a detailed view of an VFC adapter pair, respectively, in accordance with an illustrative embodiment of the invention.
Figure 2B:
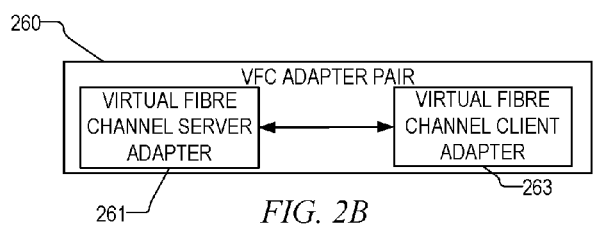

FIG. 2A is a Virtual I/O Server (VIOS) with two NPIV capable adapters in accordance with an illustrative embodiment of the invention. One of the adapters 223 has been assigned three NPIV adapter pairs 245, 247, 250. The second adapter 221 supports two NPIV adapter pairs 241, 243. There is a one-to-one relationship between a client and server adapter so that SAN security is maintained. Each VFC adapter pair, 241, 243, 245, 247, and 250 supports a single VIOS client, for example, VIOS clients 251, 252, 253, 254, and 255, respectively. Accordingly, each NPIV adapter connects to fabric, which may be NPIV enabled SAN 201. The fabric, in turn, provides interconnect to, for example, DS4000 211, switched virtual circuit 213, tape library 215 and disk drives 217. FIG. 2B shows, for example, a VFC adapter pair. The VFC adapter pair may be, for example, VFC adapter pair 260. The VFC adapter pair may be made up of a virtual fibre channel server adapter 261 and a virtual fibre channel client adapter 263.

NPIV Device Pass Thru

A Hardware Management Console (HMC) or an Integrated Virtualization Manager (IVM) creates Virtual Fibre Channel (VFC) server and client adapters to support NPIV. The creation of the adapters does not need to be exposed to the user. Two world wide port names (WWPNs) (also known as a port name pair) are allocated and assigned to the VFC client adapter. The VIOS manages the port name pair so that one is actively used by the client and the other is used during a Logical Partition (LPAR) Mobility. The active world wide port name provides the client it is on NPIV functionality.

The VIO client may rely on the Common Recall Queue (CRQ) and remote Direct Memory Access (DMA) firmware services.

The client adapter is allocated a logical world wide port name pair. The WWPN pair is an attribute of the client adapter. Accordingly, the WWPN pair is persistent over multiple Central Electronics Complex (CEC) boots. A HMC or IVM may create the client and server adapters in the LPAR profile whenever the HMC or IVM allocates a NPIV logical port.

NPIV Device Pass Thru is best described as SCSI pass thru at the device level, with the VIOS 313 abstracting out details of the physical adapter. NPIV device pass thru provides a direct conduit to devices. There is no emulation of devices; the client has unfiltered device access. If the VIOS has a NPIV Fibre channel adapter 331, 333, a logical port is created and allocated to the client partition 311. The client OS discovers, instantiates, and manages devices found on this port. A client may, accordingly, form applicable data structures to instantiate and manage such devices. Among the devices so instantiated may be, for example, an EMC 5000, an IBM 2105, among others. The VIOS may have no awareness or accessibility to these devices. The VIOS's role is to facilitate HBA sharing and the only abstraction is at the HBA level.

In NPIV pass thru, the client operating system 311 may represent the HBA as a fibre channel adapter or possibly a parallel SCSI adapter. The client representation initial implementation determines the functionality offered. Fibre channel representation allows for future extensibility including support for such features as the Common HBA API. The Common HBA API is an industry standard "C" language Application Programming Interface for management of Fibre Channel Host Bus Adapters and discovery of SAN resource. The common HBA API is used by SAN management tools to gather SAN topology allowing the NPIV Pass Thru implementation to enable SAN Management in the client.

NPIV Client Server Interface
Communication Queues

Accordingly, the embodiment may rely on a small set of CRQ messages including initialization messages, and transport event.

The VFC environment 300 allows the client 311 to use h_send_crq to send a request to the VIOS. The VIO firmware writes the CRQ element data to the VIOS command queue 460 of FIG. 4C, and asserts an interrupt. The last 64 bits of a CRQ element sent to the server that references a Spatial Reuse Protocol (SRP) Information Unit. The VIOS 313 uses h_copy_rdma to copy the SRP IU to its own memory, and acts on that SRP_Information_Unit. Once the request is completed, the VIO uses h_copy_rdma to copy an SRP Response over the clients SRP IU and calls h_send_crq to signal the client that the transaction is complete. The last 64 bits of the CRQ element reflects back a tag sent to VIOS 313 as part of transaction. An illustrative embodiment of the invention client sets the I/O Base Address (ioba) field of the CRQ structure to the mapped address of a VFC frame. The VFC frame includes a fibre channel payload. Framing information includes information such as the SCSI target identifier as well as an ioba to write the SCSI response. The SCSI response includes the FC Response IU and sense buffer. The client can choose to have response written over the VFC frame keeping the VSCSI model. The framing information is designed to be extensible and is not specific to any particular physical fibre channel adapter. The virtual port frame is discussed in detail below.

A feature of the embodiment may support asynchronous events. The server 313 needs to be able to send multiple unsolicited events to the client 311. To meet this requirement the embodiment introduces a circular queue allocated by the client that can be read, and written by the VIOS 313. The client's asynchronous queue must be mapped using its translation control entry (TCE) window as long as the client is logged into a virtual port, see NPIV login section, below. The circular queue must be mapped by contiguous TCE entries or be no more than 4096 bytes. The client 311 maps the buffers so that the VIOS can read and write to the buffers. The VIOS 313 is required to have logic to ensure that the last asynchronous event of each type that is recognized on the VIOS is not lost if the ring buffer is full, and the client is logged into the NPIV port. If the VIOS 313 receives a transport event (the response queue is no longer registered with PHYP), it does an NPIV log out on behalf of the client 311.

The first byte of all asynchronous events is called the valid byte. The VIOS writes this byte to 1 the client to 0. The VIOS only writes the byte to 1 after writing event data to the rest of the asynchronous event element. This feature can be accomplished by the VIOS performing two h_copy_rdma. The client writes this byte to 0 after reading a valid event thus freeing the element. The client must initialize all valid bytes to zero. It may be depending on the size of response element that some space mapped by the client for the ring buffer is not used. The VIOS will write from element 0, to element n−1; then write to element 0. The VIOS is required to test that an element is free, that is its valid byte is 0, before writing to the element. The client is required to ensure there are no holes in the queue. In other words, the client first frees element k prior to freeing queue element k+1 (write valid byte to 0). The VIOS signals the client that a new element has been written to the ring by calling h_send_crq to queue an element on the client's response queue. The client may choose to check for asynchronous event on every interrupt associated with its response queue or only when receiving a CRQ element for asynchronous events.

Figure 4A:
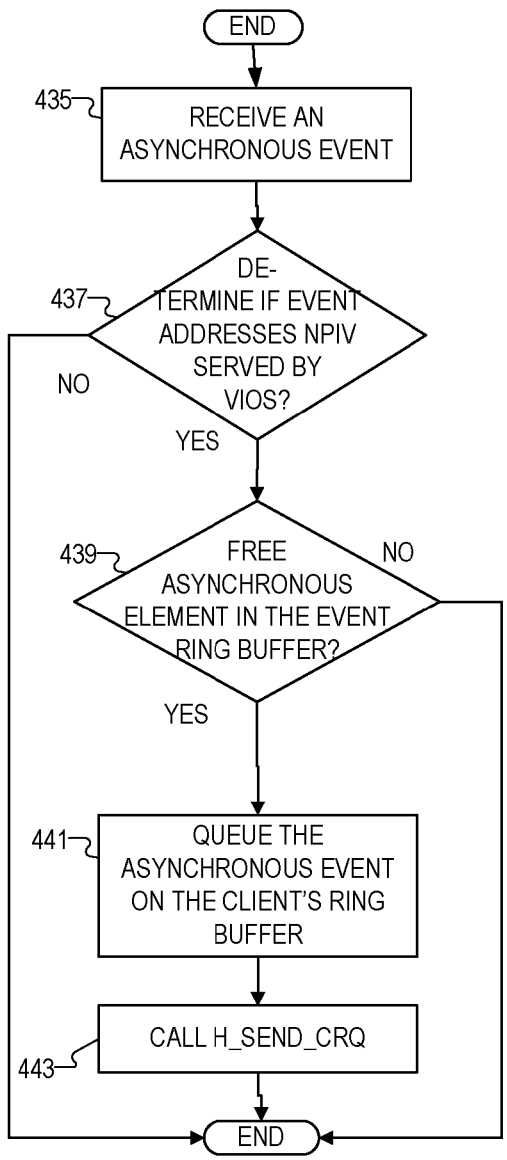
FIG. 4A is a flowchart of a VIOS handling asynchronous events in accordance with an illustrative embodiment of the invention.

FIG. 4A is a flowchart of a VIOS handling asynchronous events in accordance with an illustrative embodiment of the invention.

The physical adapter receives an interrupt for an asynchronous event (step 435).

The VIOS 231 determines if the event is for a particular NPIV 221 (step 437).

The VIOS determines there is a free asynchronous element in the event ring buffer 450, which may include reading client memory (step 439).

The VIOS queues an asynchronous event on the client's ring buffer. The VIOS may write the event information, and then write VALID byte 0x01 (step 441).

The VIOS calls h_send_crq and queues a command element (step 443).

Figure 4B:
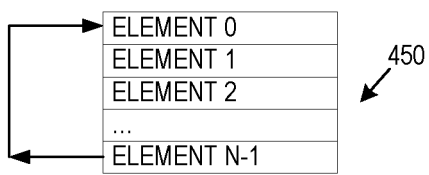
FIG. 4B is an event ring buffer in accordance with an illustrative embodiment of the invention.
Figure 4C:
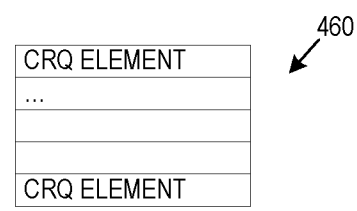
FIG. 4C is a VIOS command queue, in accordance with an illustrative embodiment of the invention.

FIG. 4C is the CRQ command queue in accordance with an illustrative embodiment of the invention. CRQ command queue 460 is comprised of a number of CRQ elements. The design choice is to use the CRQ element field. The structure of the Common Recall Queue (CRQ) command element follows:

| Constant or variable name | Value | Comment |
|---|---|---|
| struct NPIVcrq{ | | //RPA codes for valid byte |
| #define FREE_CRQ_EL | 0x00 | |
| #define VALID_CMD_RESP_EL | 0x80 | |
| #define VALID_INIT_MSG | 0xC0 | |
| #define VALID_TRANS_EVENT | 0xFF | |
| volatile uint8_t valid; | | //RPA codes for transport events |
| #define UNUSED_FORMAT | 0x00 | |
| #define PARTNER_FAILED | 0x01 | |
| #define PARTNER_DEREGISTER | 0x02 | |
| #define MIGRATED | 0x06 | //RPA codes for initialization messages |
| #define INIT_MSG | 0x01 | |
| #define INIT_COMPLETE_MSG | 0x02 | //NPIV message types |
| #define COMMAND | 0x01 | //message on the command queue |
| #define ASYNC_EVENT | 0x02 | //message on the asynchronous queue |
| #define MAD | 0x04 | //Management datagram |
| uint8_t format; | | |
| char reserved[6]; | | |
| uint64_t ioba; | | //index in future releases |
| }; | | |

Management Datagrams (MAD)

To meet the requirement of hiding adapter specifics for managing the fibre channel fabric from the NPIV client the embodiment uses management datagrams. The term management datagram is discussed in the SRP specification. SRP protocol has used in the VFC implementation. The embodiment reuses the prior VSCSI art regarding management datagrams as much as possible.

The embodiment defines a set of commands that are sent as management datagrams. The command is akin to a FC payload. The client initiates a MAD using the h_send_crq service provided by the VIO firmware. The valid field is set to 0x80 and the format field of the CRQ structure is set by the client to 0x04. The ioba field is a mapped memory address pointing to the command to be executed.

```
struct interOp{
uint32_t version;
uint32_t  reserved;
uint32_t  opcode;
uint16_t status;
uint16_t length;
uint64_t  tag;
}
```

The version field must be set to 0x01 for the first release of NPIV. Note there was no version field in the VSCSI model.

The reserved field is initialized to zero by the client.

The opcode field (called type in the VSCSI model) is the operation code for this MAD.

The status field must be initialized to zero by the client. If the command fails or the VIOS does not recognize the command, the VIOS overwrites the status field. Commands may require a context sensitive status specific to the command. Context sensitive status is not returned in the interOp header. If the VIOS does not support the command, it overwrites the interOp status field with MAD_NOT_SUPPORTED. If the VIOS encounters a parsing error, or the there is no context sensitive status and the command fails, or there is a CRQ transport fault then the VIOS overwrites the status with MAD_FAILD. The VIOS is not required to overwrite the status field if the command succeeds. Constant definitions follow:

| | |
|---|---|
| #define MAD_SUCCESS | 0x0 |
| #define MAD_NOT_SUPPORTED | 0xF1 |
| #define MAD_FAILED | 0xF7 |

The length field is the length of the command.

The tag field is reflected back to the client in the response to the MAD. The VIOS uses h_send_crq to send a command element with the format set to MAD, and the interOp.tag field set by the client is copied into the ioba field of the CRQ structure.

Command Error Handling

This section of the document is a general discussion of error handling for the various commands supported by the VIOS NPIV adapter. The errors codes listed and discussed in this section are not applicable to every command. Individual commands list applicable errors and expect the reader to reference this section of the document for details. Regardless of the type of error if the command is initiated by a MAD the VIOS writes MAD_FAILED to the interOp status field for any error detected by the VIOS. The VIOS does not inspect FC Response Information Units, responses from Common Transport Information Units sent through the pass through command so that the client must also check the response buffer as well as the interOp status field when appropriate. Client's must zero all fields specific to error handling in all commands, the VIOS should only write to these fields if it detects an error.

The VIOS may divide possible errors into logical error classes. All commands that return error information besides the MAD_FAILED have a statusFlags field which includes error class information and an errCode field. Individual commands can have other fields related to error handling.

The statusFlags field in command structures allows flexible error handling. The statusFlags field is a bit mask. Mutually exclusive bits can be used to separate error classes, other bits give the client RAS information. This allows new error classes to be added in future releases. If an error class is added older clients that do not recognized the error class must handle convert the error to a VIOS_FAILURE, and the error code to COMMAND_FAILED. See below, the reference to VIOS Failure Error Class.

Error codes are unique within an error class but not necessarily between error classes. This configuration allows an error code to be changed or added for one class of errors regardless of the error definitions specified for in another error class. If a new error code is added older clients that do not recognized the error code must convert the error class to a VIOS_FAILURE, and the error code to COMMAND_FAILED.

Constants for the statusFlags field follow:

| | |
|---|---|
| #define FABRIC_MAPPED | 0x001 |
| #define VIOS_FAILURE | 0x002 |
| #define FC_FAILURE | 0x004 |
| #define FC_SCSI_ERROR | 0x008 |
| #define HARDWARE_EVENT_LOGGED | 0x010 |
| #define VIOS_LOGGED | 0x020 |

Discussion of the RAS bits in the statusFlags follow:

The HARDWARE_EVENT_LOGGED bit is set if the VIOS logged an adapter or link error. Adapter errors are permanent error and are interpreted by the VIOS ELS software. This bit is independent of the errCode field. The errCode field is a field allocated to carry and store error codes. Error codes may be used by technicians and data processing systems to diagnose and localize anomalous behavior. The term "errCode" is a convenient shorthand used in data structures described herein.

The VIOS_LOGGED bit is set if an error was logged by the VIOS because of a failure due to some failure in the CRQ transport or a protocol in this specification was violated. This is considered a temporary error not related to hardware. This bit is independent of the errCode field.

Discussion of the error classes and their error codes are discussed in individual subsections that follow.

Fabric Mapped Class

If the error class is FABRIC_MAPPED then the VIOS could not send the payload to the SCSI target, addressed in the transaction. It is possible that this type of error is related to some asynchronous event such as a link down, see the Asynchronous Events subsection of this document for detail. There can be one or more errors returned by the fabric or adapter micro code that are mapped into one error code in this error class.

The possible error codes written to errCode field for this error class follow:

| | |
|---|---|
| #define UNABLE_TO_ESTABLISH | 0x01 |
| #define CMD_TIMEOUT | 0x03 |
| #define TRANSPORT_FAULT | 0x02 |
| #define ENETDOWN | 0x04 |
| #define HARDWARE_FAILURE | 0x05 |
| #define LINK_DOWN | 0x06 |
| #define LINK_DEAD | 0x07 |
| #define UNABLE_TO_REGISTER | 0x08 |
| #define TRANSPORT_BUSY | 0x0a |
| #define TRANSPORT_DEAD | 0x0b |
| #define CONFIGUATION_ERROR | 0x0c |
| #define NAME_SERVER_FAILED | 0x0d |
| #define LINK_HALTED | 0x0e |
| #define TRANSPORT_GENERAL | 0x8000 |

The explanation of each error follows:

The UNABLE_TO_ESTABLISH error code is written to the errCode field by the VIOS if it cannot perform a fabric login on behalf of the client. This error may occur if the switch has reached the limit of the number of virtual endpoints it supports. The VIOS cannot make this determination before attempting the login so that it cannot be determined at the time the user binds the virtual port to a physical adapter.

The TRANSPORT_FAULT error code is written to the errCode field by the VIOS if there is a fibre channel on the fabric error an example would be FC reject.

The COMMAND_TIMEOUT error code is written to the errCode field by the VIOS if the command is aborted after some time out period. The time value is set to the timeout field in the VFC frame. The timer is not started until the adapter driver attempts to send the command to the SCSI device.

The ENETDOWN error code is written to the errCode field by the VIOS if it has no connectivity to the fabric. Example of this type of problem could be a faulty fibre channel cable.

The HARDWARE_FAILURE error code is written to the errCode field by the VIOS if the adapter hardware fails.

The LINK_DOWN error code is written to the errCode field by the VIOS if this command was rejected because the VIOS link state is LINK down.

The LINK_DEAD error code is written to the errCode field by the VIOS if this command was rejected because the VIOS has no connectivity to the fabric and has had no connectivity to the fabric for a long time period. The VIOS is in this case is in a link dead state.

The UNABLE_TO_REGISTER error code is written to the errCode field by the VIOS if it cannot register for state change events on behalf of the client.

The TRANSPORT_BUSY error code is written to the errCode field by the VIOS if the fibre channel fabric returns a busy status.

The CONFIGURATION_ERROR error code is written to the errCode field by the VIOS if adapter is directly attached to a device, or it is attached to an arbitrated loop hub.

The NAME_SERVER_FAILED error code is written to the errCode field by the VIOS if the VIOS sends a command addressed to the name server on behalf of the client and the name server fails the request.

The LINK_HALTED error code is written to the errCode field by the VIOS if this command was rejected because the VIOS sent a HALTED asynchronous event to the client and has not sent a LINK_UP since that event.

The TRANSPORT_GENERAL error code is written to the errCode field by the VIOS if there was a problem on the fabric that but the specific nature of the problem could not be determined.

VIOS Failure Error Class

Errors in the VIOS failure error class may be specific to the implementation of the virtual NPIV model. The VIOS failure error class can be independent of the SAN fabric, but include errors associated with adapters.

The possible error codes written to errCode field for this error class follow:

| | |
|---|---|
| #define CRQ_FAILURE | 0x01 |
| #define SOFTWARE_FAILURE | 0x02 |
| #define INVALID_PARAMETER | 0x03 |
| #define MISSING_PARAMETER | 0x04 |
| #define HOST_IO_BUS | 0x05 |
| #define TRANSACTION_CANCELED | 0x06 |
| #define TRANSACTION_CANCELED_IMPLICIT | 0x07 |
| #define INSUFFICIENT_RESOURCE | 0x08 |
| #define COMMAND_FAILED | 0x8000 |

The explanation of each error follows:

The CRQ_FAILURE error code is written to the errCode field by the VIOS if a VIO h_call to move data to or from the client fails (see PAPR). VIOS may log an error in this case.

The SOFTWARE_FAILURE error code is written to the errCode field by the VIOS if a physical adapter driver returns adapter software failure for a particular transaction or the VFC driver is in an undefined state. VIOS may log an error in this case.

The INVALID_PARAMETER error code is written to the errCode field by the VIOS if while parsing a command it detects an invalid parameter. The VIOS logs an error in this case.

The MISSING_PARAMETER error code is written to the errCode field by the VIOS if while parsing a command a field is not set to a valid value. The VIOS logs an error in this case.

The HOST_IO_BUS error code is written to the errCode field by the VIOS if the there is a DMA failure related to the adapter hardware. VIOS may log an error in this case.

The TRANSACTION_CANCELED error code is written to the errCode field by the VIOS if the client issued a cancel command and the VIOS was able to cancel the command from the adapters queue. It is also the case that the cancel key in the cancel command matched the cancel key in the command canceled. See CANCEL_COMMAND, below, for more detail.

The TRANSACTION_CANCELED_IMPLICIT error code is written to the errCode field by the VIOS if the client issued a cancel command and the VIOS cancel the command from the adapters queue as part of processing the CANCEL_COMMAND. The cancel key in the cancel command did not match the cancel key in the command canceled but was for the same LUN. See CANCEL_COMMAND for more detail.

The INSUFFICIENT_RESOURCE error code is written to the errCode field by the VIOS if it could not allocate memory or DMA resources on behalf of a client.

The VIOS returns COMMAND_FAILED as a general error code when there is not enough information to return a specific error code.

FC Fabric Error Class

The VIOS may send one or more Common Transport Information Units (CTIU) as part of executing a command initiated by a MAD. The client is required to send the NPIV_LOGIN, and PORT_LOGIN commands. The client can choose to send its own CTIUs in place of some commands, for example in place of QUERY_TARGETS. The client may use the Fibre Channel error codes for proper error handling. The client may be limited to use some VIOS commands rather than sending a CTIU. Accordingly, the VIOS may return to the client the Fibre Channel error codes. These errors are returned as FC fabric error class error codes. Commands that can return FC Fabric errors have two additional error handling fields so that there are can be four error handling fields in the command. The VIOS writes the Fibre Channel CTIU reason code in the errCode field. See the Fibre Channel Specification for more information, including, for example, FC Fabric Generic Requirements, ANSI x3.289:1996; FC Switch Fabric and Switch Control Requirements; NCITS 321:1998, Fibre Channel 2nd Generation Physical Interface, and related Fibre Channel standards, herein incorporated by reference.

The VIOS writes the Fibre Channel CTIU explanation code in the fcExplain field.

The fcType field is not part of the Fibre Channel Specification. The fcType field maps the errors to a fabric state. This field may be useful to both AIX and Linux clients.

Possible values for fcType follow:

| #define FABRIC_REJECT | 0x01 |
| #define PORT_REJECT | 0x02 |
| #define LS_REJECT | 0x03 |
| #define FABRIC_BUSY | 0x04 |
| #define PORT_BUSY | 0x05 |
| #define BASIC_REJECT | 0x06 |

The explanation for the values follows:

Fabric reject is returned to the client if the fabric rejected the port login.

Port reject is returned to the client if the SCSI target rejected the login.

There was an Extended Link Service (ELS) sent that was rejected such as a process login command.

Fabric busy is returned if the fabric cannot honor the request at this time.

Port busy is returned if the port cannot honor the request at this time.

Basic reject is the catch all and provides no additional information.

FC SCSI Error Class

The FC_SCSI_ERROR is set if the SCSI device asserted an error. If this bit is set in the statusFlags field of a VFC Frame response then the client must interpret the FCP Response IU for proper error handling. The process login command can also set this bit if a PRLI to the device fails. No other SCSI error information is written back to the client by PROCESS_LOGIN.

Establishing an I_T Nexus

The NPIV model SCSI targets are mapped on the fibre channel SAN to the client's world wide port name. The client discovers the SCSI targets mapped to its WWPN, establishes an initiator target nexus (I_T nexus) with the SCSI target, discovers the logical units supported by those targets, and configures the logical units (LUN) of interest. Fibre channel adapter vendors typically provide firmware that abstracts some of the work of establishing an I_T nexus. The VIOS provides a set of management datagrams to allow the client partition to establish an I_T nexus through its NPIV port. Accordingly, the VIOS can hide differences in vendor firmware, allocate resources, and perform emulation to support the NPIV model.

The list of the management datagrams follow:

| NPIV_LOGIN |
| DISCOVER_TARGETS |
| PORT_LOGIN |
| PROCESS_LOGIN |
| QUERY_TARGET |

The algorithm for target discovery for AIX, Linux, and i5/OS follows: Initially, the VIO client issues an NPIV login (step 501). In response, the Fibre Channel (FC) device driver may receive the login information. Further, in response, the Fibre Channel Device Driver may send an FLogi to a switch Server in order to check whether the adapter is attached to a Physical FC Adapter. The VIO may receive a successful result if a VIO Server sends Port Login for the Name Server on behalf of VIO client. Next, the VIO client may issue a DISCOVER_TARGETS command (step 502). The discover targets command is explained further below.

For each target SCSI ID returned by DISCOVER_TARGETS command, VIOS will return to the VIO client a list of SCSI IDs of the target ports that the VIOS can access. The VIO client may determine whether to send a REPORT_SCSI_ID_CLASS (step 505). A positive result to step 505 results in the VIO client sending a REPORT_SCSI_ID_CLASS using a pass through command (step 529). Such a pass through command may be a GCS_ID command, where the VIO client obtains the class of service provided by the target. Next, the VIO client may continue at step 515, explained below.

Alternatively, a negative result to step 505 may result in the VIO client issuing a PORT_LOGIN command in order to perform a fibre channel login to the target port (step 507). A fibre channel login is also known as a FLogi. Next, the VIO client may issue a PROCESS_LOGIN command establishing an I_T nexus with the SCSI target (step 509). The Process Login (Prli) may use either a process login Management Datagram (MAD) or a Pass thru interface. Next, the VIO client may determine if more targets have been provided responsive to step 502 (step 515). If so, processing continues at step 505. Otherwise, processing terminates thereafter.

It is appreciated that an illustrative embodiment of the invention may additionally use a target World Wide Port Name to locate a corresponding SCSI target identifier to prompt the VIOS issue a QUERY_TARGET command.

Firmware provides boot support for AIX, Linux, and i5OS. Adapter manufacturers historically provide for methods that can be loaded by firmware that can be used to establish an IT Nexus. The model used by firmware the method which discovers targets expects a list of world wide port names. The embodiment provides a flag in DISCOVER_TARGETS so that the command can return a list of world wide port names.

The structure for the MAD follows:

```
struct npivLoginMad{
    Struct interOP op;
        vfcMemDescriptor login;
}
```

The NPIV structure follows:

```
#define MAX_NAME [256]
typedef struct NPIVlogin{
#define i5OS                          0x01
#define Linux                         0x02
#define AIX                           0x03
#define FIRMWARE                      0x04
    uint32_t  osType;
    uint32_t  pad;
    uint64_t  maxDMAlength;
    int32_t   maxPayload;
    int32_t   maxResponse;
    uint32_t    partition_num;                    //partition number of client
    uint32_t    vfc_frame_version;
    uint16_t    fcp_version;
#define CLIENT_MIGRATED               0x01
#define FLUSH_ON_HALT                 0x02
    uint16_t  flags ;
    uint32_t    maxCmds;
#define CAN_MIGRATE                   0x01
    uint64_t capabilities;
    uint64_t    nodeName;
    vfcMemDescriptor_t async;
    char partition_name[MAX_NAME];                //NULL terminated ASCII
                                                  // string which is
                                                  //the name of the client
                                                  //  partition
    char device_name[MAX_NAME];                   //NULL terminated ASCII
                                                  // string used to
                                                  //describe the client
                                                  //  virtual port
    char drc_name[MAX_NAME];
    uint64_t    reserved[2];
}NPIVlogin_t;
```

The firmware method "Open" returns a handle that is used in firmware read and write method the "Open" method can use QUERY_TARGET to resolve the WWPN to a SCSI identifier.

The commands are discussed in detail in their own section of this document.

NPIV_LOGIN Command

Returning to FIG. 6, the client sends a Management Datagram (MAD) to initiate the NPIV login command through the CRQ as part of its initialization sequence. The VIOS must be able to successfully login to the fabric, as well as allocate resources for the NPIV login to succeed. It is expected that the login will take considerable time. If successful, the VIOS logs into the fibre channel fabric on the client's behalf using the client's World Wide Port Name. The VIOS may also register the client's port for link events, as well as for state change notifications (step 623). The login returns a 64 bit SCSI Identifier, Port Name, and Node Name to the client (step 625). The client cannot send any other requests until it successfully logs into the VIOS using the NPIV login command.

The client sends the NPIV login as a MAD. The version field of the interoperability field may be set to 0x01, and the opcode field may be set to 0x01. The MAD has the standard interoperability structure and a memory descriptor pointing to NPIVlogin structure.

Figure 6:
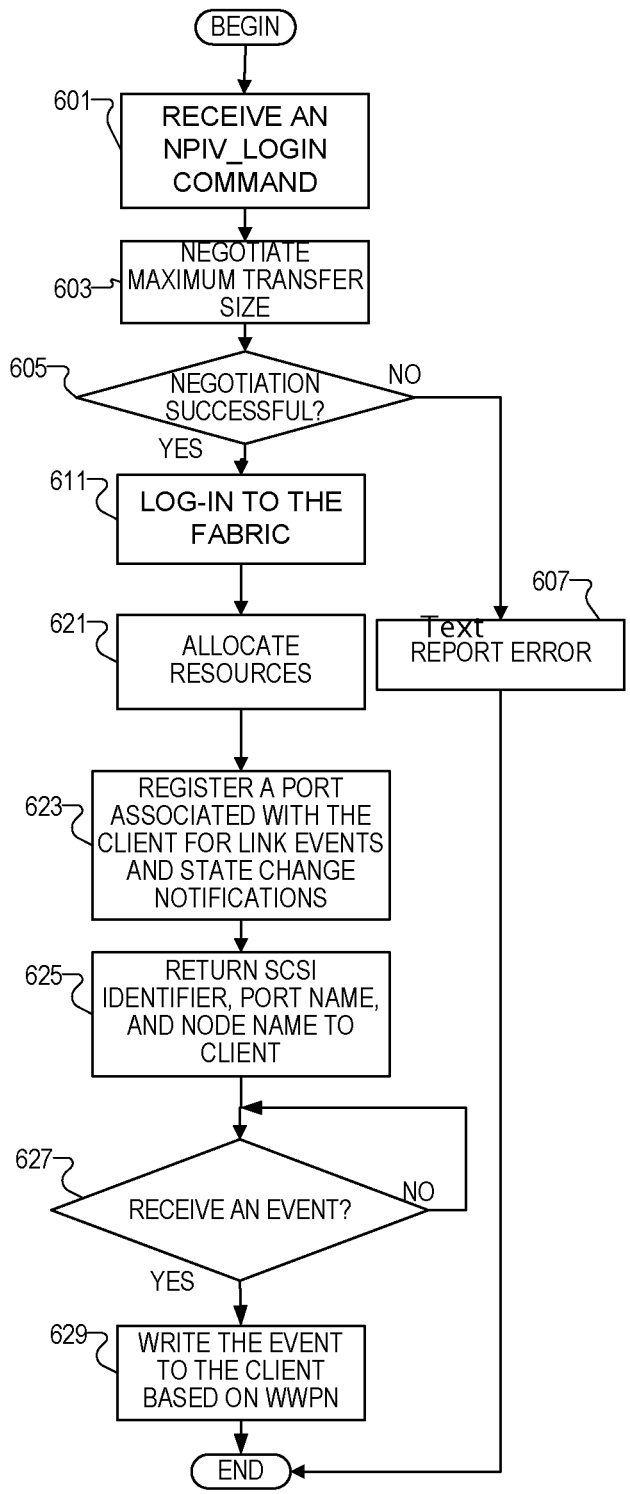
FIG. 6 is a flowchart of a VIOS mediating access to a fibre channel in accordance with an illustrative embodiment of the invention.

FIG. 6 is a flowchart of a VIOS mediating access to a fibre channel in accordance with an illustrative embodiment of the invention. The client can receive a state change notification event after successfully executing the NPIV login command. It may be the case that the fibre channel configuration changed in some way so that the SCSI identifier for the clients world wide port name changes. The client can send an NPIV login command to get the new SCSI identifier of the NPIV port. Accordingly, the VIOS may receive a NPIV login command (step 601). The VIOS is required to store any information it needs from the first successful NPIV login so that the client does not need to initialize the NPIV login structure. The client is expected to zero the buffer for reliability, availability and serviceability (RAS).

The explanation of the individual fields follows:

The osType field identifies whether the client is i5OS, Linux, AIX, or firmware. A failure may result if this field lacks a setting that corresponds to an operating system or firmware. The VIOS uses this information to help determine how much memory to allocate to support the NPIV port, and may use it in device emulation.

The maxDMALength field is set to the maximum DMA length the client requests for any one transaction. The length is in bytes. The adapter driver supporting NPIV has a settable attribute called maximum transfer size. The maximum transfer size limits the size of an I/O transaction that can be supported by the adapter. The client operating system may be sensitive to this setting. The VIOS may negotiate with a client if the client requests a larger maximum transfer size than is allowed by the adapter driver (step 603). The VIOS may determine if the negotiation was successful (step 605). Consequently, the VIOS reports the maximum size it can support in the NPIV response. Subsequently, if the client sends an I/O request including a request for a transfer size larger than reported by the VIOS, the VIOS fails the request (step 607). In response, the client may call h_free_crq.

The maxPayload field is set to the maximum length of the Fibre channel Payload that client may send in one frame. The field can be set to 32-bits (see SCSI specification regarding CDB). The length so specified is in bytes. If the client sends an I/O request with a larger fibre channel payload, then it is expected that the SCSI device will receive a malformed command and the results are dependent on the SCSI device.

The maxResponse field is set to the maximum length of the Fibre channel Response that client expects in one frame. The length is in bytes. If the size sent by the client is not sufficient for some response sent by the device then the response received by the client is dependent on the SCSI device. The VIOS assumes all responses are of size maxResponse and will copy maxReponse data back to the client, which is responsible for parsing the data. The maxResponse field includes the expected size of the sense buffer for SCSI I/O transactions, the size of the fibre channel response information unit (response IU) two 32 bit status words (see section on VFC response). The client is required to pass a memory descriptor pointing to the response buffer for each transaction. The memory descriptor can point back to the VFC frame.

Next, the VIOS may log-in to the fabric, on behalf of the client (step 611). The partition number field is the partition number of the client. The VIOS fails the login and returns MISSING_PARAMETER if this field is not set, that is if the field is 0, unless the CLIENT_MIGRATED field is set in the flags field.

The vfc_frame_version is the VFC frame version number that the client intends to use when sending I/O requests. The VFC frame is discussed later in this document the field should be set 0x01 on first release. Sending the VFC frame version information in the login allows the client to exchange this information once with the VIOS rather than per transaction. If the VIOS cannot support the VFC frame version then it logs an informational error and returns INVALID_PARAMETER. The error alerts the system administrator that they should update the VIOS.

The fcp_version field is the version of Fibre channel Protocol (see fibre channel standards on www.t10.org) that client intends to use when sending I/O requests. The FCP payload is discussed later in this document. Sending the FCP version information in the login allows the client to exchange this information once with the VIOS rather than per transaction. If the VIOS cannot support the FC version required by the client it logs an informational error and returns INVALID_PARAMETER. The error alerts the system administrator that they should update the VIOS.

The flags field is a bit mask that defaults to zero. The individual bit fields follow are described below.

The bit CLIENT_MIGRATED is set if the client is sending an NPIV login command after receiving a transport event with the reason code of MIGRATED.

The bit FLUSH_ON_HALT flag field controls VIOS behavior after the VIOS sends a HALTED asynchronous event to the client and before it sends a RESUME event. The VIOS can only flush pending commands if it sets the FLUSH_ON_HALT capabilities bit in the NPIV login response structure (see halted event).

The maxCmds field is set to the maximum number of commands the client can have outstanding, including MADs. The VIOS attempts to allocate resources based on this field (step 621). If the VIOS cannot allocate enough resources, it may avoid failing the NPIV login. The VIOS will write the maxCmds field in the NPIV login response to the maximum number of commands it can support. Accordingly, the maxCmds field may be less than or equal to the maxCmds field set by the client. If the client sends more than the maximum number of commands than is reported in the NPIV login response, then VIOS calls h_free_crq. The client may choose to call h_free_crq if the VIOS cannot satisfy the client's maxCmds requirement. The client should consider that if it can have some number outstanding commands and must cancel all of those commands then maxCmds should be set to at least N*2. This calculation sets maxCmds to be double the number, N, of outstanding commands present in the queue. Accordingly, the maxCmds is set to double the outstanding commands to permit also provide to the queue a matching cancel command for each outstanding command.

The capabilities field is a bit mask. If a bit is set in the bit mask then the client is capable of a particular function represented by the bit. The bit definitions follow:

The CAN_MIGRATE bit, when set, indicates that the client supports NPIV migration. Accordingly, the client can support breaking a SCSI 2 RESERVE and/or adding itself as an initiator for PRESISTENT RESERVE.

The client maps memory to support the Asynchronous Event Queue, see section titled Communication Queues, above. The mapped address of that queue is sent to the VIOS in the async field of the login structure. The async field is of type vfcMemDescriptor. The vfcMemDescriptor has a field for the client's mapped addresses called rem_addr, and a field for the number of bytes mapped by that address called length. The Asynchronous Event Queue can be mapped using contiguous TCE entries or be no more than 4096 bytes of memory. In the latter case, the first entry of the ring starts on a 4096 byte page boundary. The vfcMemDescriptor is discussed in detail in a later section of this document.

The client may set the nodeName field, described further in relation to asynchronous events, below. The client operating system may support having the same node name for all of its fibre channel ports. In this case, the client may set the name in the nodeName field. Otherwise, the field may be set to 0. If the field is set to 0, the VIOS may respond by choosing a node name.

The client may send the name of its partition, and the name of its NPIV port device for field serviceability. The client can send the names as NULL terminated ASCII strings in the name fields, such as nodeName and partition_name of the NPIV login structure. If either of this field is missing, the VIOS may respond by failing the login using the MISSING_PARAMETER errCode field.

The client may send a NULL terminated ASCII string, which is its Dynamic Reconfiguration Connector (DRC) name in the drc_name field. This string is used for RAS. It is expected that the DRC name can change if the client is migrated. If this field is missing, the VIOS may respond by failing the login using the MISSING_PARAMETER errCode, unless the CLIENT_MIGRATED field in the flags field is set and the drc_name field is NULL.

NPIV Login Response

The NPIV login response is written over the NPIV login structure in the client's memory. The VIOS sends a CRQ element with the NPIV Login response using the tag from the NPIV login MAD that the client set in the interOp (explained above) structure of the MAD. The format field of the NPIV Login request is set to constant MAD. The fields of login response are discussed below.

```
The NPIV login response structure follows in this section of the
document. Reserved fields are set to zero. The version,
loginStatus, versionName and drcName fields of the structure are
always valid. typedef struct NPIVloginResponse{
    uint32_t        version;                    //initally 0x01
      uint16_t statusFlags;
      uint16_t errorCode;
#define NATIVE_FIBER_CHANNEL    0x01
#define SLI_3                   0x02
      uint32_t    flags;
      uint32_t pad;
#define STRIP_MERGE             0x01
#define LINK_COMMANDS           0x02
#define ADAPTER_DEBLOCK         0x04
#define FLUSH_ON_HALT           0x08
      uint64_t capabilities;
      uint32_t maxCmds;
      uint32_t SCSIidSize;
      uint64_t maxDMALength;
      uint64_t SCSIid;
      uint64_t portName;
      uint64_t nodeName;
      uint64_t linkSpeed;
      char partitionName[MAX_NAME];             //NULL terminated ASCII
                                                  string which is
                                                //the name of the vios
                                                  partition
      char deviceName[MAX_NAME];                //NULL terminated ASCII
                                                  string used to
                                                //describe the vios virtual
                                                  port
  char portLocCode[MAX_NAME];
  char drcName[MAX_NAME];
      uchar commonService[256];
   uint64_t reserved;
} NPIVloginResponse_t;
```

The client can receive a state change notification event after successfully executing the NPIV login command. The fibre channel configuration may change the SCSI identifier for the client's world wide port name. In response, the client may send an NPIV login command to obtain a new SCSI identifier of the NPIV port. Accordingly, the VIOS may send the SCSI identifier, loginStatus, and interOp status fields to the client.

The discussion of the individual fields follows:

The version may support backward compatibility, the first release of NPIV uses a setting of 0x01.

The valid statusFlags bits that can be written by the VIOS on errors formed in response to the NPIV login command follow (see error handling section for more detail):

```
                VIOS_FAILURE
                FABRIC_MAPPED
                HARDWARE_EVENT_LOGGED
                VIOS_LOGGED
```

The VIOS can respond to an error for this command by writing VIOS_FAILURE error codes to the errCode field, as described below.

```
                INVALID_PARAMETER
                INSUFFICIENT_RESOURCE
                MISSING_PARAMETER
                COMMAND_FAILED
```

The INSUFFICIENT_RESOURCE error code may be sent by the VIOS when the VIOS has insufficient physical memory to create resources for the client, or alternatively, when there are insufficient DMA resources for the client.

The FABRIC_MAPPED error codes that can be written to the errCode field by the VIOS on error for this command may include, for example, ENETDOWN, UNABLE_TO_ESTABLISH, UNABLE_TO_REGISTER, and CONFIGURATION_ERROR. See the error handling section, above, for more details.

The ENETDOWN error code corresponds to a type of problem that can be caused by a faulty fibre channel cable. The VIOS may also log this activity or anomaly in the VIOS error logs.

UNABLE_TO_ESTABLISH corresponds to a type of problem that can be caused the switch reaching the limit of the number of virtual endpoints it supports. The VIOS cannot make this determination before attempting the login so that it cannot be determined at the time the user binds the virtual port to a physical adapter. The VIOS logs an error in the system error log on behalf of the client.

CONFIGURATION_ERROR corresponds to a type of problem that can be caused by a physical port being NPIV capable but the physical connection to the SAN cannot support NPIV. This error may occur, for instance, if the physical port is an arbitrated loop.

The flags field is a bit mask. The flags field is only valid if the login status is 0. First release there is two bits describing function they follow (see error handling section for more detail):

The NATIVE_FIBER_CHANNEL bit is set by the VIOS to assert that the underlying transport is fibre channel and that the client can use the pass through functions. This feature may enable backward compatibility if the illustrative embodiment is used to allow access to an adapter other than a fibre channel adapter.

The VFC VIOS logic may attempt to hide adapter specifics. The client, however, may send pass thru fibre channel commands. An illustrative embodiment of the invention may use an i5OS client for processor utilization reasons by taking advantage of adapter microcode to do such operations as, for example, STRIP MERGE. The VIOS hides the specifics of how STRIP MERGE commands are queued to the fibre channel adapter. Nevertheless, the VIOS may not modify the content of the buffers sent by the client for this operation. Hence, the client is responsible for ensuring that the data format and control bits within a buffer sent to the VIOS for a STRIP MERGE operation are correct for the specific adapter microcode. An illustrative embodiment of the invention may support adapters made by a specific manufacturer. A specific manufacture may make Emulex® adapters using an adapter specific function, such as Service Level Interface version 3. Emulex is a registered trademark of Emulex Corporation. The flag bit SLI_3 reflects this interface is in use so that the client can properly format data buffers for STRIP MERGE.

The capabilities field is a bit mask describing the capabilities of this virtual port. The field is only valid if the login status is 0.

The bits field definition follow:

The VIOS may set the STRIP_MERGE bit if it allows the i5OS client to take advantage of this adapter specific function.

The VIOS may set the LINK_COMMAND bit if it allows the i5OS to take advantage of adapter specific link commands.

The VIOS may set the ADAPTER_DEBLOCK bit if it can efficiently manage DMA resources for i5OS client 512-byte block support. i5OS typically uses a 520-byte block.

The VIOS may set the FLUSH_ON_HALT capabilities field if the VIOS can flush pending commands after sending a asynchronous HALTED event to the client but before sending a RESUME event (see halted event).

The maxCmds field is set to the maximum number of commands that the client can have outstanding including MADs. Note see NPIV login maxCmds field, above, for details.

The SCSIidSize is the size of the SCSI identifier returned by the fabric. The SCSIidSize may be 32 bits, which is the size of the SCSI identifiers returned by the fibre channel fabric. Alternatively, structures defined for SCSI identifiers can be 64 bits.

The maxDMALength field is set to the maximum DMA length the adapter can support. The adapter driver supporting NPIV has a settable attribute called maximum transfer size. The maximum transfer size may limit the size of an I/O transaction supported by the adapter. The client operating system may be sensitive to this setting. As explained above, on page 29, the client is includes a requested maximum transfer size as part of the information passed during login. If the client conflicts with the VIOS, then the VIOS may log an information error and call h_free_crq to terminate its connection to the VIOS. The maxDMALength field is only valid if the login status is 0.

The SCSIid field is the SCSI Identifier assigned to the clients' WWPN by the fibre channel fabric. The SCSI identifier can be obtained by using an FDISC command. The field is only valid if the login status is 0. This field can change after any NPIV login request.

The portName is the world wide port name in use for the client. For example, the port name can be wwpn1, or wwpn2. If the client partition migrates and it is using wwpn1, then after the login on the target Central Electronics Complex (CEC) it may use wwpn2. The client should not however assume this to be the case so that in future implementations NPIV no longer requests two world wide port names client code does not change. The field is only valid if the login status is 0.

The nodeName is the node name assigned to the virtual port. This field is only set if the nodeName field in the NPIV login request was set to 0 by the client and the login status is 0.

The VIOS reports the current speed of the physical fibre channel link to the client in the linkSpeed field. The client is free to ignore this field. The field is only valid if the login status is 0.

The partitionName is a NULL terminated ASCII string with the server's partition name from the open firmware tree. It is sent regardless of the login status for RAS purposes. This name is expected to change after the client is migrated.

The deviceName is a NULL terminated ASCII string with the name given by the VIOS to the VFC sever adapter instance. The name may be used by the client for RAS.

The portLocCode is a NULL terminated ASCII string with the location code of the physical port mapped to the VFC server adapter. The location code may be used for RAS to identify an adapter on the VIOS.

The drcName is a NULL terminated ASCII string with the DRC name of the VFC server adapter. This name can change to change after the client is migrated.

DISCOVER_TARGETS Command

The client sends a MAD to initiate the DISCOVER_TARGETS command. The opcode field of the interoperability structure is set to 0x02. The discover target command returns a list of SCSI identifiers or world wide port names. The list includes one SCSI identifier or WWPN for each SCSI target that is mapped to the client's WWPN. The VIOS may query the Fibre channel name server for the list on behalf of the client. The client can choose to obtain a list of target SCSI identifiers using the pass thru MAD and the appropriate fibre channel GID_FT. The client may use the DISCOVER_TARGETS command to avoid exposing differences in vendor specific adapter micro-code. Accordingly, the fabric may return to the client 32 bits for each target. The upper 8 bits may be flag fields, while the remaining bits may provide a SCSI ID.

The structure for the DISCOVER_TARGETS MAD is described below.

```
struct discoverTargets{
    struct interOP op;
        vfcMemDescriptor_t buffer;
        #define SCATTER_GATHER          0x01
        #define PORT_ID_WWPN_LIST       0x02
        uint32_t flags;
        uint16_t statusFlags;
    uint16_t errorCode;
        int32 lengthOfBuffer;
        int32 numAvailable;
        int32 numWritten;
        uint64_t reserved[2];
}
```

The explanation of each field in the structure follows:

The buffer field of the discoverTargets MAD or command is a memory descriptor for referencing mapped memory. The client may access more targets than can be returned in one page of memory. Accordingly, the client may respond by either mapping the memory buffer with contiguous TCEs (where page size is assumed to be 4096) by providing a buffer field pointing to a scatter/gather list in the client's memory. A scatter/gather list is list of memory descriptors, explained below. If the memory descriptor points to a scatter/gather list, then the flag field may be set accordingly. The VIOS can use one or more calls to h_copy_rdma to copy the SCSI identifiers to the client's memory buffer. The buffer field of the structure may be qualified by the WWPN_LIST flag field.

The client may provide a memory buffer large enough to hold the list of SCSI identifiers to be mapped to its WWPN if the bit field WWPN_LIST in the flags field is not set. The SCSI identifiers copied to the client's buffer may be 32 bit unsigned integers. The client may use the SCSIidSize in the NPIV login response structure to determine the size of SCSI identifiers returned in the list. Accordingly, the associated client adapter 455 may present the SCSI identifier in a format expected by its I/O stack.

The client can provide a memory buffer large enough to hold the list of port identifiers and world wide port names to be mapped to its WWPN, provided that the bit field PORT_ID_WWPN_LIST in the flags field is set. The VIOS may copy a list of 32 bit port identifiers where the upper-most byte may be control information. The port name may be 64 bits long. A buffer or pad of 32 bits may be between the port identifier and port names. Such a pad may preserve 64-bit alignment. A client adapter may be configured to present the SCSI identifier in a format to match a format used by the client's I/O stack.

The flags field is a bit mask the bit fields follow:

```
#define SCATTER_GATHER      0x01
#define PORT_ID_WWPN_LIST   0x02
```

The explanation of each bit field follows:

If the scatter/gather field is set in the bit mask then the buffer field references a scatter/gather list.

If the port identifier wwpn list field is set, then the DISCOVER_TARGETS command writes a list of port identifiers and world wide port names.

The VIOS can write the valid statusFlags bits in response to an error for DISCOVER_TARGETS command follow (see error handling section for more detail):

```
FABRIC_MAPPED
VIOS_FAILURE
VIOS_LOGGED
HARDWARE_EVENT_LOGGED
```

The VIOS_FAILURE error codes that can be written to the errCode field by the VIOS on error for this command follow (see error handling section for more detail):

```
CRQ_FAILURE
COMMAND_FAILED
```

The FABRIC_MAPPED error codes that can be written to the errCode field by the VIOS on error for this command follow (see error handling section for more detail) include, for example, COMMAND_TIMEOUT, LINK_DOWN, TRANSPORT_BUSY, TRANSPORT_DEAD, and LINK_HALTED. In addition, the error codes may include NAME_SERVER_FAILED. The NAME_SERVER_FAILED error code is used if the physical fabric is accessible to the VIOS but the device, acting as a name server for that fabric, fails the DISCOVER_TARGETS command. Such a command sent instructs the fabric to gather the list of targets for the client.

The lengthOfBuffer field contains data that describe the length of the mapped memory in bytes.

If the buffer provided by the client is too small to hold all of the SCSI identifiers for the target assigned to its WWPN, the client may respond as needed. Accordingly, the client can write the numAvailable field of the discoverTargets structure as 0. The VIOS overwrites the field with the number of SCSI targets assigned to the client's WWPN if the number of SCSI targets is greater than 0. As a result, the client can map additional buffer space and resend the command.

The numWritten must be set to 0 by the client. The VIOS overwrites this field with the number of SCSI identifiers written to the client's memory buffer(s) if that number is greater than 0.

PORT_LOGIN Command

The client sends a MAD to initiate the PORT_LOGIN command. The opcode field of the interoperability structure can be set to 0x04. The client must use this command rather than a pass through command with the appropriate CTIU to log into the target port. The client is expected to call port login for each SCSI target it discovers using the DISCOVER_TARGETS command or a GID_FT. The VIOS attempts to log into the SCSI target using the SCSI_ID field.

The structure for the MAD follows:

```
struct portLogin{
    struct interOP op;
    uint64_t SCSI_ID;
        uint16_t pad1;
        uint16_t fcServiceClass;
        int32_t blockSize;
        int32_t headerPerBlock;
        uint16_t statusFlags;
        uint16_t errorCode;
        uint16_t fcExplain;
        uint16_t fcType;
        uint32_t pad2;
        uchar serviceParameters[256];
        uchar serviceParametersChange[256];
        uint64_t reserved[2];
}
```

The explanation of each field in the structure follows:

The SCSI_ID field is the SCSI identifier of a target device, see DISCOVER_TARGETS. The VIOS attempts to log into the SCSI target and if the login fails the VIOS overwrites the interOp status field of the portLogin structure.

The blockSize field is set by clients intending to use strip/merge or link commands. The field is the block size for this device. Clients not using strip/merge must set this field to 0.

The headerPerBlock field is set by clients intending to use strip/merge. It is the size of the header per block of data. Clients not using strip/merge must may indicate this limitation by setting this field to 0.

The valid statusFlags bits that can be written by the VIOS on error for this command include, for example, VIOS_FAILURE, FC_FAILURE, HARDWARE_EVENT_LOGGED, and VIOS_LOGGED.

The VIOS_FAILURE error codes that can be written to the errCode field by the VIOS on error for this command follow include, for example, INVALID_PARAMETER, INSUFFICIENT_RESOURCE, MISSING_PARAMETER, and COMMAND_FAILED.

If there is an FC_FAILURE error the VIOS may overwrite the errCode field with a CTIU reason code returned by the fibre channel fabric. Further details are described below in relation to error handling. If there is an FC_FAILURE error the VIOS may overwrites the fcExplain field with a CTIU reason code returned by the fibre channel fabric. If there is an FC_FAILURE error the VIOS may overwrite the fcType field.

The seviceParameters field can be copied back to the client if the login to the SCSI target is successful. The VIOS may pass this field back to the client without modification. The client may respond accordingly to the common service parameters. Common service parameters include, for example, the world wide port name, and node name of the SCSI target.

The serviceParametersChange field is bit mask with a one to one correspondence to the supported bits in the service-Paremeters field. If a mask bit is set, a corresponding service parameter is settable.

The VIOS may use the service parameters when logging into a SCSI target. The service parameters are passed back to the client as part of PORT_LOGIN.

PROCESS_LOGIN Command

The client may send a MAD to initiate the PROCESS_LOGIN command. Accordingly, the opcode field of the interoperability structure may be set to 0x08. The client may call this command for a SCSI target in response to a PORT_LOGIN command for that target succeeding. A successful PROCESS_LOGIN command may establish an Initiator Target Nexus (I_T Nexus) between a client's WWPN SCSI identifier and the target's SCSI identifier. The client can use a pass thru MAD where the payload is the appropriate Extended Link Services (ELS).

The structure for the PROCESS_LOGIN MAD follows:

```
struct processLogin{
    struct interOP op;
    uint64_t SCSI_ID;
        uchar serviceParameters[16];
    uchar future [64-16];
    uint16_t statusFlags;
        uint16_t errCode;
        uint32_t pad;
        uint64_t reserved[2];
}
```

The explanation of each field in the structure follows:

The VIOS attempts to do Process Login (PRLI) to the SCSI target described in the command. If the process login fails, then the VIOS overwrites the status field of the processLogin structure.

Alternatively, responsive to a successful port login, the VIOS writes the 256-byte FCP common service parameters as part of a response to the client partition. The VIOS may also write a change mask, which specifies service parameters that the client can change. The PORT_LOGIN command is explained in more detail, above. The client creates 16-byte serviceParameters field from that information. The process login may be, for example, in accordance with the SCSI-3 specification, which is herein incorporated by reference.

The valid statusFlags bits that can be written by the VIOS on error for the PROCESS_LOGIN command may be, for example, VIOS_FAILURE, FC_SCSI_ERROR, HARDWARE_EVENT_LOGGED, and VIOS_LOGGED. The VIOS_FAILURE error codes that can be written to the errCode field by the VIOS in response to an error for this command can be, for example, INSUFFICIENT_RESOURCE, and COMMAND_FAILED.

Note: If PRLI fails; no other SCSI error information is written back to the client.

QUERY_TARGET Command

Dynamic Tracking

If the fibre channel's fabric changes, for example, as a user moves a cable from one switch port to another, or a client partition is migrated from one CEC to another CEC, the I_T nexus the client established can be lost. Mature I/O stacks have logic to track changes. The logic may re-establish I_T nexus to some of targets as well as perform housekeeping on internal data structures. The logic on both the client and VIOS for this problem is referred to as dynamic tracking.

The VIOS provides Management Datagrams (MAD) for dynamic tracking so that the VIOS can maintain its own internal data structures. In addition, the client can implement dynamic tracking for devices accessed via NPIV.

QUERY_TARGET Command

The client sends a MAD to initiate the QUERY_TARGET command. The opcode field of the interoperability structure is set to 0x010. The QUERY_TARGET command may carry the WWPN of a SCSI target. The client may accordingly receive a SCSI_ID. The client is assumed to have read the WWPN from the common service parameters of returned by PORT_LOGIN or the appropriate FCP pass through. The VIOS overwrites the SCSIid field with the SCSI identifier of the target port in response to a successful completion of the QUERY_TARGET command. Otherwise, the VIOS may overwrites the VIOSstatus field. The client can use this command to verify that SCSI identifier assigned to the world wide port name remains valid after an SCN event. The QUERY_TARGET command is sent by the VIOS to the Directory Name server, which is at a well known address.

The structure for the QUERY_TARGET MAD follows:

```
struct queryTarget{
    struct interOP op;
    uint64_t WWPN;
    uint64_t SCSI_ID;
    uint16_t statusFlags;
    uint16_t errorCode;
    uint16_t fcExplain;
    uint16_t fcType;
    uint64_t reserved[2];
}
```

The explanation of each field in the structure follows:

The WWPN field is the world wide port name of the SCSI target. The client initializes this field.

The SCSI_ID field is overwritten with the SCSI identifier of the target port returned by the name severs; if the QUERY_TARGET command succeeds.

The valid statusFlags bits that can be written by the VIOS on error for this command follow (see error handling section for more detail):

VIOS_FAILURE
FC_FAILURE
HARDWARE_EVENT_LOGGED
VIOS_LOGGED

The VIOS_FAILURE error codes that can be written to the errCode field by the VIOS on error for this command are, for example, CRQ_FAILURE, INSUFFICIENT_RESOURCE, and COMMAND_FAILED. The description of error handling section is further described above.

If there is an FC_FAILURE error the VIOS may overwrite the errCode field with CTIU reason code returned by the fibre channel fabric. Note that in this case the client should check for the reason code port name not registered. It means that the client no longer has access to the SCSI target through the NPIV port. If there is an FC_FAILURE error the VIOS may overwrite the fcExplain field with a CTIU explanation code that was returned by the fibre channel fabric. If there is an FC_FAILURE error the VIOS may overwrite the fcType field in response to the error.

MOVE_LOGIN Command

Returning to FIG. 6, the VIOS may receive an event on behalf of the client (step 627). Accordingly, the client may receive a State Change Notification event from the VIOS. The VIOS may permit the client to receive the SCN by writing the event to the client based on the WWPN (step 629). The event may indicate that a change in the fibre channel fabric has invalidated a SCSI identifier of a target port. The client can use the QUERY_TARGET command to determine if a target port SCSI identifier changed. If so, then the client can send a MAD to initiate the MOVE_LOGIN command. The opcode field corresponding to the MOVE_LOGIN command is 0x020, and accordingly set in the interoperability structure. The MOVE_LOGIN command does several operations that can be done by the client by initiating multiple commands. Using MOVE_LOGIN, however, may alleviate timing conditions that, depending on the client dynamic tracking logic, may result in the client not being able to re-establish an I_T nexus with the target port. Processing may terminate thereafter.

The MOVE_LOGIN command accepts the invalid target identifier and the new target identifier as parameters. The MOVE_LOGIN may perform operations, for example, implicit logout of the destination SCSI identifier, implicit logout of the destination SCSI identifier, and port login to the new SCSI Identifier.

An implicit logout of the destination SCSI identifier associated with the old SCSIid may not send commands to the fabric. Consequently, client may avoid having to wait for some timeout period for the command to fail.

The structure for the MAD follows:

```
struct moveLogin{
    struct interOP op;
    uint64_t oldSCSI_ID;
        uint64_t newSCSI_ID;
        uint64_t WWPN;
    uint64_t nodeName;
        uint32_t flags;
        int32 pad;
        uchar seviceParameters[256];
    uchar seviceParametersChange[256];
        uint64_t reserved[2];
}
```

The explanation of each field in the structure follows:

The oldSCSI_ID field is the SCSI identifier that was assigned to the SCSI target before there was a change in the fibre channel fabric.

The newSCSI_ID field is the SCSI identifier that was assigned to the SCSI target after there was a change in the fibre channel fabric.

The WWPN field is the world wide port name of the SCSI target.

The nodeName field is the node name of the SCSI target.

The VIOS may copy the seviceParameters field and return it to the client if the login to the SCSI target is successful. The VIOS passes this field back to the client without modification. Common service parameters include the world wide port name, and node name of the SCSI target. There may be other fields of interest to the caller. Note, see FCP specification, Fibre Channel Protocol –3, found at http://www.t10.org/drafts.htm, and equivalent documents, herein incorporated by reference.

The serviceParametersChange field is a bit mask with a one to one correspondence to the supported bits in the service-Paremeters field. If a mask bit is set, then the corresponding service parameter is settable.

The flags field qualifies the status field. It is a bit mask and more than one bit can be set. The VIOS will attempt all three operations and the appropriate bit is set for each operation that fails.

The constants for the bit mask follow:

| #define IMPLICIT_OLD | 0x01 |
|---|---|
| #define IMPLICT_NEW | 0x02 |
| #define PORT_LOGIN | 0x04 |

This is a pass fail command so that the only error written to the client is MAD_FAILED in the interOp structure.

IMPLICIT_LOGOUT Command

The client may receive a State Change Notification (SCN) event from the VIOS. The event may indicate that some change in the fibre channel fabric has invalidated a SCSI identifier of a target port. For example, this event may be triggered by removing a cable from one physical port on the switch and connect the cable to another port. If the client logic determines that the SCSI target is not valid and the client logic fails to use the MOVE_TARGET command, the client logic initiates a MAD to issue the IMPLICIT_LOGOUT command. The opcode field of the interoperability structure corresponding to the IMPLICIT_LOGOUT command is 0x040. The structure for the IMPLICIT_LOGOUT MAD follows:

```
struct implicitLogout{
    struct interOP op;
    uint64_t oldSCSI_ID;
    uint64_t reserved[2];
}
```

The explanation of each field in the structure follows:

The oldSCSI_ID field is the SCSI identifier that was assigned to the SCSI target before there was a change in the fibre channel fabric. The IMPLICIT_LOGOUT command is a pass fail command. Accordingly, the only error written to the client is MAD_FAILED in the interOp structure.

Common HBA Interface

The common Host Based Adapter interface is an Application Programming Interface (API) used by SAN management tools. The API allows the any management code to use a common interface across multiple SAN adapters. The SAN adapters are more fully described in "Fibre Channel—Methodologies for Interconnects (FC-MI)", INCITS TR-30-2002, November 2002, DeSanti, et al., which is herein incorporated by reference. The API is flexible enough for the tools to map the SAN topology and show hardware dependencies. The API may request the client OS to permit a caller to query default Report Node Identifier Data (RNID), and optionally change some of the defaults data stored therein.

The VIOS may transmit an RNID command to support such a query. The client uses the RNID command for the query. The VIOS is required to honor the RNID parameters per NPIV port if set by the client. However, if the client does not change default behavior, the adapter defaults are enforced. The client is only expected to do this on some event specific to its stack that supports the common HBA interface.

The client sends a MAD to initiate the RNID command. The opcode field of the interoperability structure is set to 0x80. The structure for the MAD follows:

```
struct rnid{
        struct interOP op;
#define SET_RNID         0x02
#define GET_RNID         0x04
        uint32_t flags;
        uint16_t statusFlags;
        uint16_t errorCode;
        uint32_t pad;
        uint32_t rnidBufferLength;
        uint32_t rnidVersionClient;
        uint32_t rnidVersionVIOS;
        vfcMemDescriptor_t  rnidBuffer;
        uint64_t reserved[2];
```

} The rnidBuffer or buffer, explained below, points to mapped memory pointing to an RNID structure. If the client is setting the RNID parameters, then the buffer is initialized by the client. If the client is querying the RNID parameters, then the VIOS writes the buffer.

The flags field must be initialized by the client. The bit fields can be, for example, SET_RNID, and GET_RNID. The client may set the SET_RNID bit in the flags field if it is setting the RNID port parameters. The SET_RNID bit is mutually exclusive to GET_RNID bit. The client may set the GET_RNID bit in the flags field if it is requesting the write of the current RNID port parameters, described below, to the rnidBuffer. This bit is mutually exclusive to GET_RNID bit.

The valid statusFlags bit that can be written by the VIOS on error for this command may be, for example, VIOS_FAILURE. The VIOS_FAILURE error codes that can be written to the errCode field by the VIOS on error for this command may be, for example, INSUFFICIENT_RESOURCE, INVALID_PARAMETER, and MISSING_PARAMETER.

The rnidBufferLength is the length of the buffer allocated and mapped by the client for RNID data.

The RNID buffer is based on a current common HBA interface. It is likely that this interface may change in the future regardless of FCP version in use for NPIV. The version field in the interOp structure may not be adequate to allow the VIOS and client to support RNID backward compatibility for this command. The rnidVersionClient and rnidVersionVIOS fields may enable backward compatibility. The client sets both fields to 0x01 for the first release of NPIV. The VIOS overwrites the rnidVersionVIOS field with a version the VIOS can support if the format of the VOIS-returned-buffer is different than the one the client requested. In addition, the VIOS overwrites the rnidVersionVIOS field with a version the VIOS can support if it cannot write a buffer because the rnidVersionVIOS field it can support may request more buffer space than allocated by the client.

The RNID command is a pass fail command. Consequently, the VIOS may write an error to the client using the MAD_FAILED in the interOp structure. This command may not fit in the general error handling scheme.

The definition of the rnidBuffer follows:

```
struct rnidData{
    uint    opcode;                              //Link services code
    uchar   node_id_fmt;                         //Node ID format
    uchar   com_nid_len;                         //Common Node ID length
#define RNID_COM_NID_LEN 16
    uchar   resvd1;                              //Reserved for future use
    uchar   spfc_nid_len;                        //Specific Node ID Length
#define RNID_SPFC_NID_LEN 52                     //Common Identification
                                                   Data
    unsigned long long port_name;                //port name (WWN)
    unsigned long long node_name;                //node/fabric name
                                                 //Specific topology
                                                   discovery data
    uint64_t vendor_unique;                      //Vendor unique
    uint32_t node_type;                          //Type of node
#define RNID_TYP_UNKN          0x1               //Unknown type
#define RNID_TYP_OTHER         0x2               //Other type
#define RNID_TYP_HUB           0x3               //Hub type
#define RNID_TYP_SWITCH        0x4               //Switch type
#define RNID_TYP_GW            0x5               //Gateway type
#define RNID_TYP_CONVERTER     0x6               //Converter type
#define RNID_TYP_HBA           0x7               //Host Bus Adapter
#define RNID_TYP_PROXY         0x8               //Proxy-agent
#define RNID_TYP_STOR_DEV      0x9               //Storage device disk,
                                                   CD,etc)
#define RNID_TYP_HOST          0xa               //Host
#define RNID_TYP_STOR_SYS      0xb               //Storage Subsystem
                                                   (raid,library)
#define RNID_TYP_MODULE        0xc               //Module
#define RNID_TYP_SW_DR         0xd               //Software driver
    uint32_t port_number;                        //Physical port number
    uint32_t num_att_nodes;                      //No. of Attached Nodes
    uchar node_mgmt;                             //Node Management
#define RNID_MGMT_IP_UDP_SNMP     0x0            //Protocol IP,UDP,SNMP
#define RNID_MGMT_IP_TCP_TELNET   0x1            //Protocol IP,TCP,Telnet
#define RNID_MGMT_IP_TCP_HTTP     0x2            //Protocol IP,TCP,HTTP
#define RNID_MGMT_IP_TCP_HTTPS    0x3            //Protocol IP,TCP,HTTPS
    uchar   ip_version;                          //IP Version
#define RNID_IPV4              0x1               //IP Version 4
#define RNID_IPV6              0x2               //IP Version 6
    ushort    udp_port;                          //UDP Port
```

-continued

```
uint64_t    ip_addr[2];              //IP address of
                                       management entity
uchar resvd2[2];                     //reserved for future use
ushort disc_flags;                   //topology discovery
                                       flags
#define RNID_TOP_DISC_SPT      0x1   //Topology Discovery
                                       Support
#define RNID_LOOP_POS_VALID    0x2   //Loop Position Valid
}
```

Cancel Command

Physical adapters typically have memory resources used by adapter firmware to command queues. The adapter driver helps manage the resources during error recovery. An adapter driver may be, for example, fibre channel adapter 455 of FIG. 4. The various vendors have different interfaces to manage the queues. The VIOS may support a cancel command, which may be a generic interface. The clients are required to use this command in place of issuing a command to the adapter. Accordingly, a legacy client may be used without significant modification to the client. The client may coordinate a cancel command to avoid destroying a task management command sent to a logical unit as part of that same error recovery.

As an example, the Emulex adapter interface allows commands sent to the adapter to accept a unique key that identifies one or more commands that the adapter microcode cancels. The unique key can be, for example, cancelKey, explained below. The key can be 32 or 64 bits in size depending on the command used by the adapter driver. Accordingly, the client sends a 32-bit key and the VIOS can adapt the 32-bit key for use within a 64-bit key or VIOS key. The upper 32 bits of the VIOS key may ensure that the keys created by various clients are unique on the VIOS. The VIOS key is the cancelKey field in the Virtual Fibre Channel (VFC) frame, as described below.

As another example, the Q-Logic adapter uses microcode to manage the queues based on target identifiers and logical units. The client, in order to effectively interact with the Q-Logic adapter, sends a cancelKey, a logical unit identifier and target SCSI identifier. The VIOS is required to mask the differences in the interface. The Q-Logic adapter may, during some intervals, cancel more commands than the Q-logic adapter receives from the client. Accordingly, the VIOS writes the adapter status error code to the VFC frame.

The client sends a MAD to initiate the cancel command. The opcode field of the interoperability structure is set to 0x100.

The structure for the MAD follows:

```
struct cancel{
    struct interOP op;
    uint64_t SCSIid;
    uint64_t LUNaddr;
    uint32_t flags;
    uint32_t cancelKey;
    uint32_t myCancelKey;
    uint32_t pad;
    uint64_t reserved[2];
```

} The explanations of the fields follow:

The SCSIid field is the SCSI identifier of the SCSI target port.

The LUNaddr field is the logical unit address of the logical unit that may have commands pending on the adapter.

The flags field is a bit mask. The client must set this field. Bit 6 is set if the LUNaddr field in this structure is valid. The other bits associate the cancel command to a task management command, they are mutually exclusive. It is expected that the client sends a cancel command while processing a task management command.

Constants for the bit fields follow:

```
#define ASSOC_CLEAR_ACA          0x01
#define ASSOC_ABORT_TASK         0x02
#define ASSOC_ABORT_TASK_SET     0x04
#define ASSOC_CLEAR_TASK_SET     0x08
#define ASSOC_LUN_RESET          0x10
#define ASSOC_TARGET_RESET       0x20
``` define LUA_VALID 0x40 The cancelKey is a unique 32 bit identifier that is used to cancel all outstanding commands on the adapter that are tagged in the VFC frame with this same value.

The myCancelKey is the cancel key for this cancel command. It allows the client to time a cancel command and attempt to cancel it if there is not response from the VIOS. AIX client has this level of error recovery; other clients may also need this ability.

The cancel command is a pass/fail command. Accordingly, the only error written to the client is MAD_FAILED in the interOp structure.

LINK_STATE Command

See asynchronous event handling, above.

PASSTHRU Command

Client adapter drivers may have interfaces that allow applications to send FC packets to the fabric. These packets are created by the application rather than the client's drivers. The commands may be to the fiber channel fabric and the payload of the command may be bigger than what is expected for typical I/O. The VIOS may use the passthru command to provide the client the flexibility to send commands with minimal impact to resource usage. The client sends a MAD to initiate the passthru command.

The opcode field of the interoperability structure is set to 0x200.

The structure for the MAD follows:

```
struct passThru{
    struct interOP op;
    vfcMemDescriptor_t command;
```

} The memory descriptor points to a passThruFrame, which describes the transaction to the VIOS.

The passThruFrame structure follows:

```
struct passThruFrame{
    uint64_t taskTag;
    uint32_t cmdLength;
    uint32_t responseLength;
```

```
        uint16_t statusFlag;
        uint16_t errorCode;
        uint32_t flags;
        uint32_t cancelKey;
        uint32_t pad;
    vfcMemDescriptor_t command;
    vfcMemDescriptor_t response;
        uint64_t correlation;
        uint64_t targetSCSIid;
        uint64_t tag;
        uint64_t reserved[2];
}
```

This structure shares fields with the VFC frame. Shared fields are described in the VFC frame section, below. Fields unique to this structure are, for example, cmdLength, responseLength and statusFlags, described below.

The cmdLength is the length of the payload. If the length of a field exceeds the payload length negotiated during NPIV login for VFC frames, then this command can take a substantial amount of time and fail because of resource constraints.

The responseLength is the length of the response buffer mapped by the client that can be used for this transaction. If the length of a field exceed the response length negotiated during NPIV login for VFC frames, then this command can take a substantial amount of time and fail because of resource constraints.

The valid statusFlags bits that can be written by the VIOS on error for this command follow (see error handling section for more detail):

```
        FABRIC_MAPPED
        VIOS_FAILURE
        HARDWARE_EVENT_LOGGED
        VIOS_LOGGED
        FC_SCSI_ERROR
```

If the VIOS_FAILURE bit is set in the flags field then the following errors can be expected in the status field:

```
        CRQ_FAILURE
        SOFTWARE_FAILURE
        HOST_IO
        TRANSACTION_CANCELED
        TRANSACTION_CANCELED_IMPLICIT
        COMMAND_FAILED
```

The FABRIC_MAPPED error codes that can be written to the errCode field by the VIOS on error for this command follow (see error handling section for more detail):

```
        TRANSPORT_FAULT
        CMD_TIMEOUT
        HARDWARE_FAILURE
        LINK_DOWN
        TRANSPORT_BUSY
        TRANSPORT_DEAD
        LINK_HALTED
```

The flags field is a bit mask it must be set. The MAD fails if the flags field is zero, more than one bit in the bit mask is set, or an unsupported bit is set. The flags field describes the payload to the VIOS so that it can process the request without cracking the payload. The constants follow:

```
        #define FC_ELS          0x01
        #define FC_CT_IU        0x02
``` define PROCESS_LOGIN 0x04 The explanation of the bit fields follow:

The FC_ELS bit is set if the request encoded in the payload is a Fibre Channel ELS.

The FC_CT_IU bit is set if the request encoded in the payload is a Fibre Channel CT IU.

The PROCESS_LOGIN bit is set if the request is an ELS that encodes a process login. This constant is used instead of the FC_ELS for the case of process login.

SCSI Commands and Task Management

The NPIV client discovers SCSI targets and through them logical units assigned to its world wide port name. The VIOS provides a communications path to the physical fibre channel fabric so that the client can send SCSI commands to its SCSI targets. Transactions can be thought of as having two distinct parts framing information and a payload. The framing information needs to provide enough information to be able to address system memory and a logical unit. The payload describes the command. The embodiment may request that the VIOS hides most adapter specific details associated with sending a transaction to the SCSI target. To meet this requirement a frame is defined in this section of the document for the VFC.

Payload

The payload is according to specification for fibre channel protocol information unit as defined in the fibre channel specifications for Fibre CChannel Protocol version 3. The FCP 3 however is insufficient for both the i5OS and AIX clients, which both issue target reset to tape devices. The bit defined in FCP 2 for target reset is a reserved bit in FCP 3. It is expected that clients may intentionally violate the FCP 3 and use the reserve bit to issue a target reset to tape devices. The payload is typically 32 bytes, but may be larger can be larger for embodiments that support additional length CDB.

Protocol Response Unit

The fibre channel responses received by the VIOS for SCSI transactions are copied without change to the client partition. The protocol response unit is defined in the fibre channel specifications for Fibre channel Protocol version 3. The reader of this document is presumed to be familiar with SCSI specifications and the website www.t10.org.

Memory Descriptors

The NPIV may rely on remote DMA. This architecture may use firmware, and hardware services that allow the VIOS to map client memory so that it can be read or written by an adapter in a secure manner. The architecture may use a mapping on both the client and VIOS partitions. Hence, to be able to satisfy most SCSI requests the embodiment may define a VFC memory descriptor. Scatter/gather lists sent by the client are a list of VFC memory descriptors.

Remote DMA may be according to, for example, the IBM remote DMA architecture. Such an architecture allows for an address mapped on the client to be 64 bits in length. The mapping uses a TCE defined in the POWER Architecture Platform Reference (PAPR) the mapped address or I/O Base Address (IOBA) is a TCE index. The contents of the TCE describe a number of bytes of physical memory. The structure definition for the vfcMemDescriptor follows:

```
typedef struct vfcMemDescriptor{
    uint64_t    rem_addr;    // tce index << 12 | offset
```

```
    uint64_t    length;    //length of the data for this
                                       transfer
} vhbaMemDescriptor_t;
```

VFC Frame

The VIOS uses information to address the payload to a SCSI target. Such information may include a scatter/gather list. Particular adapters may support features of interest to some clients, for instance strip merge. There are also RAS requirements placed on some operating systems that need to be considered. Since it is required that the VFC frame support all these requirements it is a superset of what any one manufacture's adapter requires to address an I/O operation. The fields are ordered so that what is considered the least likely information needed for Reliability, availability, and serviceability (RAS), or the least intrusive to trace is at the top of the structure. The fields at the top of the structure are most likely to be over-written with the FCP response IU. If the VIOS cannot copy the frame from the client's memory using h_copy_rdma it asserts an error. It is expected that the VFC frame definition can be used for pass through commands. The VFC structure follows:

```
struct vfcFrame{
uint64_t taskTag;
uint32_t frameType;
uint32_t payloadLength;
uint32_t responseLenght;
uint32_t adapter_resid;
uint16_t statusFlags;
uint16_t errorCode;
uint16_t flags;
uint16_t response_flags;
uint32_t cancelKey;
uint32_t exchangeId;
vfcMemDescriptor_t extendedFunction;
vfcMemDescriptor_t ioba;
vfcMemDescriptor_t response;
uint64_t correlation;
uint64_t targetSCSIid;
uint64_t tag;
uint64_t reserved[2];     //this field marks the beginning of
                              the fcp payload,
                          //it is of size payloadLength. See
                              SCSI specifications for details
}
```

The discussion of individual fields of the VFC structure follows:

The taskTag field is a 64 bit identifier. The tag field for the fiber channel protocol used by the embodiment may be 32-bits. This field is used for task management commands. The client may be enabled to handle for task tags. Subfields in the task tag for link commands may include, for example, the exchange identifier.

The frame type field refers to the type of FCP frame that issued for this transaction. This field allows the clients the flexibility to support native fibre channel protocol, and/or adapter-specific features. The field can be used to support link commands. If the flags field of vfcFrame has the bit set for linked command, then this field is set to the appropriate frame type. This field can also be used to support pass thru protocol used by the common HBA interface.

The FCP payload length is the length of the payload. The length field allows the VIOS to support additional length SCSI control blocks without requiring it parse Command Data Block (CDB) in the FCP payload. The length may not exceed the length negotiated during NPIV login.

The FCP response length is the length of the memory buffer that is mapped for the FCP response IU. The length may not exceed the length negotiated during NPIV login. Otherwise, an error may be reported. If the length field is zero, then the client does not expect an FCP response IU from the payload.

The cancelKey field is a 32-bit tag that is set by the client. See section on cancel command, above.

The exchangeId field is a 32 bit identifier. This field is used for link commands.

The flags field qualifies other fields in vfcFrame or alerts the VIOS that it may need to snoop the payload in this frame. The flag is a bit mask. The following is a list of constants for each defined bit in the mask with a description of when they are expected to be used.

define SCATTER_GATHER_LIST 0x01

If this bit is set, then the ioba field of the frame is a memory descriptor that points to a scatter gather list in the clients memory. The VIOS must copy the scatter gather list into its own memory to process the command.

define NO_MEMORY_DESCRIPTOR set, the 0x02

If this bit is set, then the command described by the payload does not require system memory resources. The IOBA field of the frame is invalid.

define READ 0x04

If this bit is set, then this command does a read from the clients memory to the device.

define WRITE 0x08

If this bit is set, then this command does a write from the device to the clients memory.

define STRIP_MERGE 0x10

If this bit is set, then this is a strip merge operation and the extended function memory descriptor must be valid. Note for the extended function memory descriptor cannot be overloaded to point to a scatter gather list so that it must reference memory that is mapped by contiguous TCE entries.

define FIRST_LINKED_COMMAND 0x20

If this bit is payload describes a linked command. The command fails if the frame type field is not set to a valid value. The bit is set if this is the first of two commands that are linked.

define SECOND_LINKED_COMMAND 0x40

If this bit is set, then the payload describes a linked command-.set, the The command fails if the frame type field is not set to a valid value. The bit is set if this is the second of two commands that are linked. The fabric identifier must be valid if this bit is set.

define TASK_MANAGEMENT 0x80

If this bit is set, then the payload describes a task management command and the key field is valid.

define CLASS_3 ERROR 0X100

If this bit is set, then the payload expects to use FC class 3 error recovery. This bit is mutually exclusive to the TASK_MANAGMENT bit.

The extendedFunction field is a memory descriptor. Memory descriptors are discussed in a previous section of this document. An illustrative embodiment may use the extendedFunction field to support the SLY-3 strip merge function and reference a data buffer in the client's memory. If the STRIP_MERGE bit in the flags field is set, then this field is valid. Otherwise, the field is invalid. If both the STRIP_MERGE and the NO_MEM_DES bits are both missing, the VIOS asserts an error and does not send the transaction to the fabric. This strip merge function allows for more efficient processor utilization by an i5OS client. The validity of the format and content of the buffer may be handled by the i5OS client.

The IOBA field is an ioba memory descriptor. Memory descriptors are described above. The ioba memory descriptor is qualified by the flags field. If the NO_MEM_DES flag bit is set, then this field is invalid. If neither the SCATTER_GATHER_LIST flag bit nor NO_MEM_DES flag bit is set, the memory descriptor maps a sufficient number of bytes to satisfy the SCSI request in the CDB of the FCP payload. If the SCATTER_GATHER_LIST flag bit is set, then the memory descriptor points to a scatter gather list. The client creates a list of memory descriptors, called a scatter/gather list, if it cannot map sufficient memory with contiguous TCE entries to satisfy the SCSI request. If the VIOS cannot copy the scatter gather list into its own memory using h_copy_rdma it asserts an error and does not send the transaction to the fabric. If the NO_MEM_DES flag bit and SCATTER_GATHER_LIST flag bit are both set, then the VIOS asserts an error and does not send the transaction to the fabric.

The response field is a memory descriptor. Memory descriptors are discussed in a previous section of this document. The memory descriptor may point to a buffer that is large enough to hold the responseLength value the client set in VFC frame. Accordingly, the client may to initialize the buffer since the VIOS is not required to write the buffer if the FC IU succeeds.

The correlation field is a 64-bit handle sent by the client to trace the I/O operation. The adapter driver for the physical fibre channel adapter, for example, FIG. 4, block 431, may support tagging an I/O operation. If the physical fibre channel supports this feature, then the correlation field can be used to track and I/O operation through both the client I/O stack and the VIOS.

The targetSCSIid field is a 64-bit address of a SCSI target, called a SCSI identifier. The target SCSI identifier is port relative. The target SCSI is returned to the client on a successful Process Login.

The tag field is a 64-bit opaque value. The tag is reflected back to the client in the last 64 bits of the CRQ element sent by the VIOS to indicate it has written a response for this frame. The client must encode enough information to find the response from the tag field.

The adapter_resid field can be set to 0 by the client.

The response_field can be set to 0 by the client. Additional details are explained below.

VFC Frame Response

The VIOS may not be required to inspect the SCSI response from a VFC frame. The VIOS may not be required to write the FC Response IU if the FC IU succeeds. Accordingly, the client may initialize the FC Response IU buffer. There are error conditions that are not expected to be returned in an FC Response IU. Such error conditions can include, for example, that a command is canceled or that an adapter hardware failed in response to an unexpected command presented to a logical unit. The appearance of these error conditions may cause the VIOS to overwrite the status and flags field in the VFC frame with error codes. The client may initialize the status field to 0 to limit overhead in good path processing.

The valid statusFlags bits that can be written by the VIOS on error for this command follow command are as follows.

---
FABRIC_MAPPED
VIOS_FAILURE
FC_SCSI_ERROR
HARDWARE_EVENT_LOGGED
VIOS_LOGGED
---

The VIOS_FAILURE error codes that can be written to the errorCode field by the VIOS on error for this command are as follows.

---
INVALID_PARAMETERS
TRANSACTION_CANCELED
TRANSACTION_CANCELED_IMPLICIT
COMMAND_FAILED
---

The FABRIC_MAPPED error codes that can be written to the errorCode field by the VIOS on error for this command are as follows.

---
HOST_IO_BUS_ERR
TRANSPORT_FAULT
CMD_TIMEOUT
HARDWARE_FAILURE
LINK_DOWN
TRANSPORT_BUSY
TRANSPORT_DEAD
LINK_HALTED
TRANSPORT_GENERAL
---

The adapter_resid field may be set to 0 by the client. It may be written by the VIOS if the physical adapter reports a residual data count for a transaction initiated by the client. The adapter residual data field, if valid, is a deficiency, measured in bytes, that an adapter formed by failing to write data sufficient to satisfy the SCSI transaction. This field may be compared to the residual data field returned by the SCSI target. The VIOS may set the ADAPTER_RESID_VALID bit in the response_flags if the client sets this field. Otherwise, the field is invalid unless the bit is set.

The response_flags field can be set to 0 by the client. It is a bit mask. The response_flags field may be, for example, ADAPTER_RESID_VALID 0x01 This bit is set if the adapter_resid field of the VFC frame was written by the VIOS.

Asynchronous Events

The VIOS is responsible for reporting fibre channel fabric asynchronous events to clients. The client provides a mapped ring buffer the management of the buffer is explained in the section titled "Communications Queues". The VIOS drops events if the asynchronous queue is full. Asynchronous events may be reported using the following structure:

```
struct async{
    uchar valid;
    uchar pad [3];
    uint32_t pad2;
    uint64_t    event;
    uint64_t    SCSIid;
    uint64_t    wwwpn;
    uint64_t    nodeName;
    uint64_t    reserved[1];
}
```

The individual fields are discussed below.

The valid field is written to a 0x01 by the VIOS and 0x00 by the client. The section of this document titled "Communications Queues" discusses the valid field.

The SCSid field is the SCSI identifier of a target. This field may not be valid for all events. The field is set to zero if it not valid.

The wwpn field is the world wide port name of the target. This field may not be valid for all events. The field is set to zero if it is not valid.

The nodeName field is the node name of the target. This field may not be valid for all events. The field is set to zero if it is not valid.

The event field is the asynchronous event that is being reported by the VIOS. There are three classes of events: unsolicited ELS events, state change notification events, and link events.

The constants for the unsolicited ELS events follow:

| #define PLOGI | 0x01 |
| #define LOGO | 0x02 | define PROCESS_LOGO 0x04 The discussion of each ELS event follows:

The PLOGI event is an initiator login to the client's N-port. This event the VIOS writes the target's NPORT identifier, world wide port name, and node name in the asynchronous event structure in the appropriate fields if the information is sent to the VIOS.

The logo event is typically asserted if the fibre channel fabric reports that a target n-port logged off. This event the VIOS writes the target's SCSI identifier, world wide port name, and node name in the asynchronous event structure in the appropriate fields if the information is sent to the VIOS.

The process logout event is typically asserted if there is a process logout by the SCSI target reported by the fibre channel fabric. This event the VIOS writes the target's SCSI identifier if the information is sent to the VIOS.

The fibre channel fabric reports target state changes. The state changes can be for a single NPORT identifier, a group of NPORT identifiers, a collection of devices, or the entire fabric may have changed. State change notification may trigger dynamic tracking logic on the client. The VIOS simply reports that a change occurred.

The following constants are defined for state change

| #define SCN_NPORT | 0x008 |
| #define SCN_GROUP | 0x010 |
| #define SCN_DOMAIN | 0x020 |
| #define SCN_FABRIC | 0x040 |

The constants for the link events follow:

| #define LINK_UP | 0x080 |
| #define LINK_DOWN | 0x100 |
| #define LINK_DEAD | 0x200 |
| #define HALTED | 0x400 |
| #define RESUME | 0x800 |

Each link event is explained as follows.

The link up event (LINK_UP) is sent if the link is reestablished with the fibre channel fabric.

The link down event (LINK_DOWN) is sent if the link to the fibre channel fabric is lost.

The link dead event (LINK_DEAD) is sent if the link to the fibre channel fabric is lost and cannot be recovered after a long time out period.

The halt event (HALTED) is sent to the client if there is a time window where the adapter cannot be used. The window or time-out period may correspond to a period comparable to a time of a typical microcode download. This window or time-out period can be up to 5 minutes. The client can use the FLUSH_ON_HALT bit to change the VIOS behavior after it sends the asynchronous HALTED event and before the link is restored.

If the client sets the FLUSH_ON_HALT flag in the NPIV login structure, then the VIOS flushes all commands that are not on the adapter's active queue with LINK_DOWN after sending this event. The VIOS may be configured to support this behavior if the VIOS set the FLUSH_ON_HALT capabilities bit in NPIV response structure.

Figure 7:
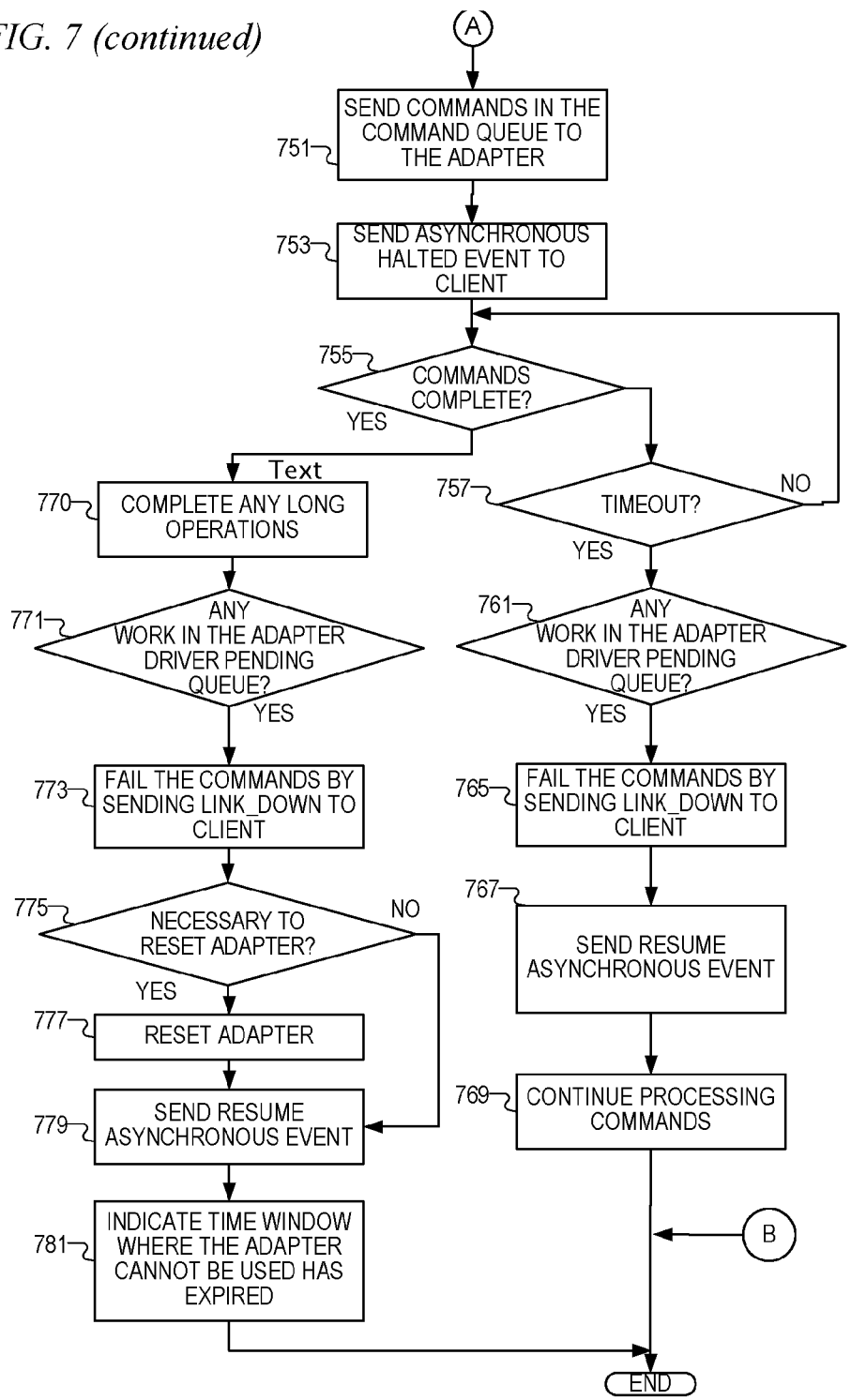
FIG. 7 is a flowchart of a VIOS handling asynchronous events in accordance with an illustrative embodiment of the invention.

FIG. 7 is a flowchart of a VIOS handling asynchronous events in accordance with an illustrative embodiment of the invention. Initially, VIOS sends asynchronous HALTED event to client (step 701).

If there is work on adapter driver pending queue or there is work in the command queue (step 703) the VIOS fails the commands with LINK_DOWN (step 705).

If there is work on the adapter driver active queue (step 707) the VIOS waits for some time period for the commands to complete (step 709).

If the command on the active queue do not complete in a reasonable time period the VIOS sends RESUME asynchronous event and continues processing commands (step 715).

If the commands complete within a reasonable time period then the VIOS does the following:

Completes long operation such as microcode download or changing the VFC server adapter mapping (step 711).

If appropriate (step 713) reset adapter (step 714).

VIOS sends RESUME asynchronous event (step 715).

If the flag is reset, then the pending commands in the adapter's pending queue are flushed back after the link is up but before a LINK_UP event is sent to the client. Commands in the command queue are sent to the adapter (step 751). The expected VIOS behavior follows:

VIOS sends asynchronous HALTED event to client (step 753).

If there is work on the adapter driver active queue the VIOS waits for some time period for the commands to complete (step 753). A timeout period may be checked (step 757)

If the commands on the active queue do not complete in a reasonable time period the VIOS does the following.

If there is work on adapter driver pending queue (step 761) the VIOS fails the commands with LINK_DOWN (step 765).

VIOS sends RESUME asynchronous event (step 767) and continues processing commands (step 769).

If the commands complete within a reasonable time period then the VIOS does the following:

Completes long operation such as microcode download or changing the VFC server adapter mapping (step 770).

If there is work on adapter driver pending queue (step 771) the VIOS fails the commands with LINK_DOWN (step 773).

If appropriate (step 775) reset adapter (step 777).

VIOS sends RESUME asynchronous event (step 779).

The resume event to indicate the time window where the adapter cannot be used has expired (step 781). Processing terminates thereafter.

The VIOS may detect an adapter failure. Responsive to such a failure, the VIOS may assert an asynchronous event. This asynchronous event may allow a client running Multi Path I/O software to fail to an alternate path faster than if the client did not receive the asynchronous event. The constant for adapter failure follows:

define ADAPTER_FAILED 0x1000

LINK_STATE Command

A client's asynchronous queue may be full when the VIOS receives a link up event. The client may have alternative ways to recover from this case. For example, the VIOS may monitor the client's link state, which can be up, down, or dead. The VIOS may also implement the link state command to allow the client to query the current link state. Clients may use this command to protect from aberrant cases. For example, a client may periodically poll for link status if the client is in a link down or link dead state. The client must also determine that if a link up state is lost, then one or more SCN events may have been lost during failure recovery. The client may sends a MAD to initiate the LINK_STATUS command. The opcode field of the interoperability structure can be set to 0x400.

The structure for the MAD follows:

```
struct linkStatus{
    struct interOP op;
    uint32_t state;
    uint32_t reserved;
}
```

The client may initialize the state field, above, to 0. The VIOS overwrites this field with the current link state if the MAD is successful. The constants used for link state have the same values as constants with the same name in the asynchronous event section described above. The constant names follow:

```
LINK_UP         0x080
LINK_DOWN       0x100
LINK_DEAD       0x200
```

HALTED 0x400 The VIOS may send both HALTED and RESUME events to the client. If the client queries the state after a HALTED event is sent but before a RESUME event, the state returned is HALTED. If client queries the state after a RESUME is sent, the state returned is LINK_UP.

The illustrative embodiments provide a method, data processing system, and computer program product for interfacing to a Fibre Channel adapter protocol driver in a client operating system and providing N_Port ID Virtualization (NPIV) features. Accordingly, illustrative embodiments of the invention provide a protocol between Virtual I/O Server (VIOS) and client operating systems for communication, error detection, and error correction features. One or more embodiments may support existing Fibre Channel Protocol (FCP) drivers without modification to the associated driver. In addition, one or more embodiments may use a Storage Area Network (SAN) bridge to transport the protocol.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system.

Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to receive messages for a client, the method comprising:
   receiving an N_port ID virtualization (NPIV) login command from the client;
   logging in to a storage area network;
   allocating at least one physical resource;
   registering a world wide port name associated with the client for link events and state change notifications;
   returning a SCSI identifier, the world wide port name, and node name to the client;
   receiving an event from the storage area network, the event selected from a group consisting of a link event and a state change notification; and
   writing the event to the client based on the world wide port name associated with the client.

2. The computer implemented method of claim 1, wherein the client is an operating system hosted on a data processing system.

3. The computer implemented method of claim 1, wherein allocating physical resources comprises allocating physical resources based on a maximum number of commands the client can have outstanding.

4. The computer implemented method of claim 1, further comprising:
negotiating a maximum transfer size that is no larger than is allowed by an adapter driver.

5. The computer implemented method of claim 4, wherein logging in to the storage area network is in response to negotiating the maximum transfer size that is no larger than is allowed by the adapter driver.

6. The computer implemented method of claim 5, wherein the world wide port name (WWPN) is an attribute of a client adapter associated with the client.

7. The computer implemented method of claim 1, wherein the event from the storage area network is an event that changes a feature of the storage area network, the feature selected from the group consisting of at least one fibre channel n_port identifier, domain, or link status.

8. The computer implemented method of claim 1, wherein the step of writing the event to the client based on the world wide port name associated with the client comprises: direct memory access writing the event to the client based on the world wide port name associated with the client.

9. A computer program product to receive messages for a client, the computer program product comprising: a computer usable storage device having computer usable program code embodied therewith, the computer program product comprising:
computer usable program code configured to receive an N_port ID virtualization (NPIV) login command from the client;
computer usable program code configured to log in to a storage area network;
computer usable program code configured to allocate at least one physical resource;
computer usable program code configured to register a world wide port name associated with the client for link events and state change notifications;
computer usable program code configured to return a SCSI identifier, the world wide port name, and node name to the client;
computer usable program code configured to receive an event from the storage area network, the event selected from a group consisting of a link event and a state change notification; and
computer usable program code configured to write the event to the client based on the world wide port name associated with the client.

10. The computer program product of claim 9, wherein the client is an operating system hosted on a data processing system.

11. The computer program product of claim 9, wherein computer usable program code configured to allocate physical resources comprises computer usable program code to allocate physical resources based on a maximum number of commands the client can have outstanding.

12. The computer program product of claim 9, further comprising:
computer usable program code configured to negotiate a maximum transfer size larger than is allowed by an adapter driver.

13. The computer program product of claim 12, further comprising:
computer usable program code configured to determine whether negotiating was successful; and wherein computer usable program code to log in to the fabric is in response to a determination that negotiating was successful.

14. The computer program product of claim 13, wherein the world wide port name (WWPN) is an attribute of a client adapter associated with the client.

15. The computer program product of claim 9, wherein the event from the storage area network is an event that changes a feature of the storage area network, the feature selected from the group consisting of at least one fibre channel n_port identifier, domain, or link status.

16. The computer program product of claim 9, wherein the computer usable program code configured to write the event to the client based on the world wide port name associated with the client comprises: computer usable program code configured to direct memory access write the event to the client based on the world wide port name associated with the client.

\* \* \* \* \*